(12) United States Patent
Beutel et al.

(10) Patent No.: US 12,046,879 B2
(45) Date of Patent: Jul. 23, 2024

(54) SWITCHING ARRANGEMENT

(71) Applicant: Siemens Energy Global GmbH & Co. KG, Munich (DE)

(72) Inventors: Stefan Beutel, Berlin (DE); Andreas Kleinschmidt, Oranienburg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/614,636

(22) PCT Filed: May 11, 2020

(86) PCT No.: PCT/EP2020/062984
§ 371 (c)(1),
(2) Date: Nov. 29, 2021

(87) PCT Pub. No.: WO2020/239405
PCT Pub. Date: Dec. 3, 2020

(65) Prior Publication Data
US 2022/0231487 A1 Jul. 21, 2022

(30) Foreign Application Priority Data
May 29, 2019 (DE) .................... 10 2019 207 926.1

(51) Int. Cl.
*H02B 13/035* (2006.01)
*H02B 13/045* (2006.01)
*H02B 13/075* (2006.01)

(52) U.S. Cl.
CPC ....... *H02B 13/045* (2013.01); *H02B 13/0352* (2013.01); *H02B 13/0358* (2013.01); *H02B 13/075* (2013.01); *H02B 13/0354* (2013.01)

(58) Field of Classification Search
CPC ................... H02B 13/0354; H02B 13/0358
See application file for complete search history.

(56) References Cited

U.S. PATENT DOCUMENTS

| | | | | | |
|---|---|---|---|---|---|
| 3,930,188 | A | * | 12/1975 | Olsen | H02B 1/24 361/624 |
| 4,503,481 | A | * | 3/1985 | Fujiya | H02B 5/06 361/612 |
| 4,829,400 | A | * | 5/1989 | Enomoto | H02B 13/0352 361/612 |
| 4,837,662 | A | * | 6/1989 | Takeuchi | H02B 13/035 361/612 |

(Continued)

FOREIGN PATENT DOCUMENTS

| | | |
|---|---|---|
| CN | 1140351 A | 1/1997 |
| CN | 1926735 A | 3/2007 |

(Continued)

*Primary Examiner* — Robert J Hoffberg
(74) *Attorney, Agent, or Firm* — Laurence A. Greenberg; Werner H. Stemer; Ralph E. Locher

(57) ABSTRACT

A switching arrangement includes a circuit breaker in an upright first circuit breaker encapsulation section. A first disconnector is disposed in a first disconnector encapsulation section and a second disconnector is disposed in a second disconnector encapsulation section. The disconnector encapsulation sections are disposed on a lateral surface of the circuit breaker encapsulation section.

13 Claims, 13 Drawing Sheets

(56) References Cited

U.S. PATENT DOCUMENTS

| | | | | |
|---|---|---|---|---|
| 4,890,193 | A | * | 12/1989 | Tsubaki .................. H02B 5/06 361/612 |
| 4,967,307 | A | * | 10/1990 | Itou ................... H02B 13/0352 361/612 |
| 5,796,060 | A | | 8/1998 | Fuechsle et al. |
| 5,872,346 | A | | 2/1999 | Meinherz et al. |
| 6,188,034 | B1 | * | 2/2001 | Tsuzura ............. H02B 13/0352 218/43 |
| 6,278,073 | B1 | * | 8/2001 | Tsuzura .................. H01T 4/08 218/43 |
| 6,515,247 | B1 | * | 2/2003 | Tsuzura ............. H02B 13/0352 218/43 |
| 7,193,172 | B2 | * | 3/2007 | Rokunohe ............... H01H 33/22 218/43 |
| 7,764,486 | B2 | * | 7/2010 | Otsuka ............. H02B 13/0352 218/69 |
| 7,835,140 | B2 | * | 11/2010 | Mori ........................ H02B 1/22 361/612 |
| 7,911,770 | B2 | * | 3/2011 | Fujita ....................... H02B 5/06 361/612 |
| 8,000,087 | B2 | * | 8/2011 | Fujita ....................... H02B 5/06 218/69 |
| 8,228,665 | B2 | * | 7/2012 | Fujita ....................... H02B 5/06 218/78 |
| 8,710,388 | B2 | * | 4/2014 | Utsumi ................ H01H 31/003 218/120 |
| 9,502,868 | B2 | * | 11/2016 | Kagawa ............ H02B 13/0352 |
| 9,853,424 | B2 | * | 12/2017 | Ono ......................... H02B 5/06 |
| 2006/0283841 | A1 | | 12/2006 | Sologuren-Sanchez et al. |

FOREIGN PATENT DOCUMENTS

| | | | |
|---|---|---|---|
| CN | 104143777 A | 11/2014 | |
| DE | 3733664 A1 | 4/1988 | |
| DE | 4319378 A1 | 12/1994 | |
| DE | 4438776 C1 | 4/1996 | |
| DE | 19542979 A1 * | 5/1996 | ............... H02B 7/01 |
| DE | 19649613 A1 | 6/1998 | |
| EP | 2003755 A2 | 12/2008 | |
| JP | S60187215 A * | 3/1977 | |
| JP | 52038324 U * | 9/1985 | |
| JP | H0279706 A | 3/1990 | |
| JP | H0724443 B2 * | 3/1995 | |
| JP | 2009303416 A * | 12/2009 | ........... H02B 13/056 |
| WO | WO 2014003943 A1 | 1/2014 | |
| WO | 2014032943 A1 | 3/2014 | |

\* cited by examiner

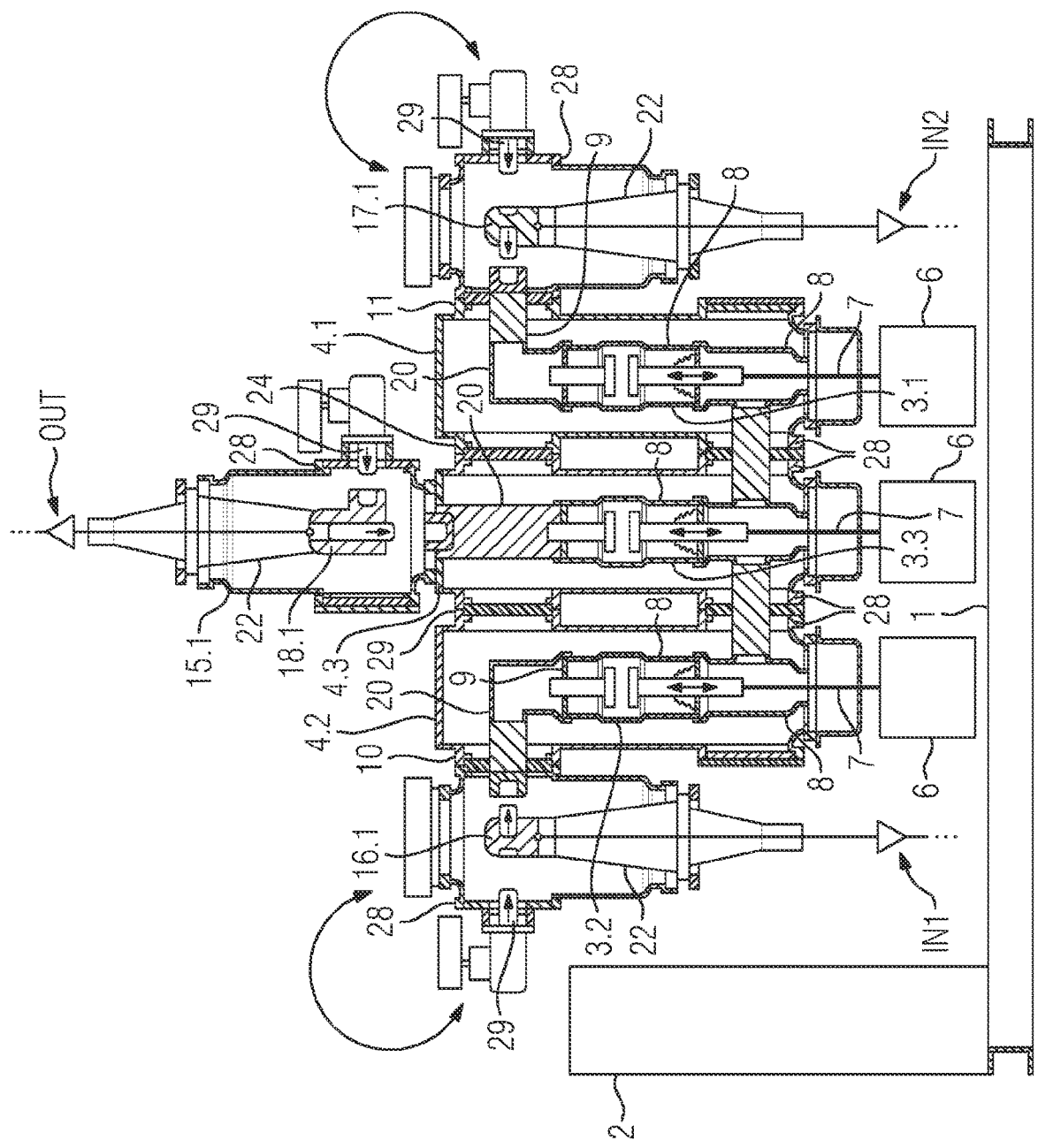
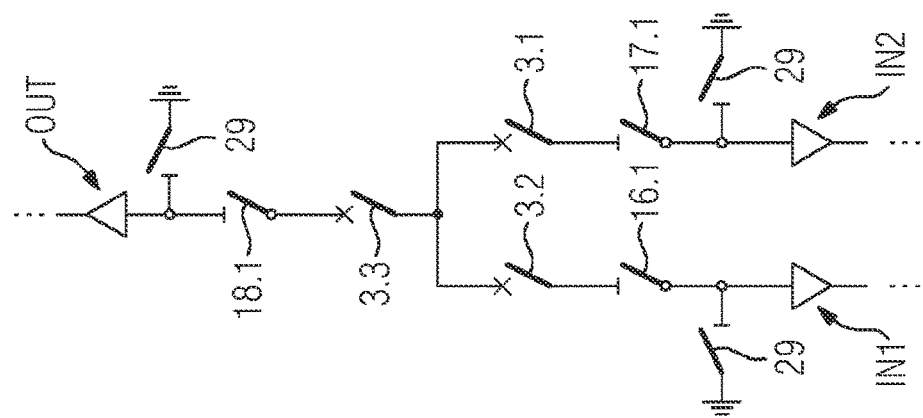
FIG 13

SWITCHING ARRANGEMENT

FIELD AND BACKGROUND OF THE INVENTION

The invention relates to a switching arrangement comprising a circuit breaker in an upright first circuit breaker encapsulation section.

SPECIFICATION

A switching arrangement is known, for example, from PCT publication WO 2014/032943 A1. In said document, a circuit breaker is arranged in an upright circuit breaker encapsulation section. The switchgear assembly described in said document has a compact footprint, and therefore it can also be used in confined spaces. The known switchgear assembly is designed, in particular, for use in tower-like structures. The switchgear assembly has reduced flexibility owing to its high degree of specialization.

SUMMARY OF THE INVENTION

Therefore, the object of the invention is to specify a switching arrangement which can be adapted to different operating conditions in a simplified manner while retaining compact dimensions.

According to the invention, the object is achieved in a switchgear assembly of the kind mentioned at the outset by way of a first disconnector being arranged in a first disconnector encapsulation section and a second disconnector being arranged in a second disconnector encapsulation section, wherein the disconnector encapsulation sections are arranged on the lateral surface of the circuit breaker encapsulation section.

A switching arrangement is used to switch a phase conductor. Phase conductors are used to transport electrical power over large distances. For this purpose, a potential difference is applied to the phase conductors, wherein an electric current is carried in the phase conductor driven by the potential difference. A circuit breaker can be, for example, part of a phase conductor of this kind. The circuit breaker is surrounded by a circuit breaker encapsulation section. The circuit breaker encapsulation section provides mechanical protection for the circuit breaker received in its interior. An encapsulation section, such as a circuit breaker encapsulation section for example, can have electrically conductive and electrically insulating regions. For example, a main body can be of electrically conductive design and regions through which a phase conductor is to be guided can have an electrically insulating action. An electrically insulating region can embed a phase conductor in a fluid-tight manner for example, so that the phase conductor passes through a barrier, which is formed by the encapsulation section, in a fluid-tight manner. Furthermore, an electrically insulating region can serve to support the phase conductor. The phase conductor, through which the electric current is to be transported, can be switched by means of the circuit breaker. In order to electrically insulate the phase conductor, an electrically insulating fluid can wash around said phase conductor. Said electrically insulating fluid can be prevented from undesirably evaporating by the circuit breaker encapsulation section. For this purpose, an encapsulation section can constitute a fluid-tight barrier. If required, provision may be made for a pressure that differs from that of the surrounding area, in particular an overpressure, to be applied to the electrically insulating fluid in the interior of the circuit breaker encapsulation section. As a result, the dielectric strength of the electrically insulating fluid can be positively influenced. The electrically insulating fluid can wash around the circuit breaker in the interior of the circuit breaker encapsulation housing and can also be used to flush a switching path of the circuit breaker and to function as a switching gas of the circuit breaker. However, furthermore, provision may also be made for the circuit breaker to have a switching path which is arranged within a tube, so that the electrically insulating fluid is prevented from entering a switching path of the circuit breaker. A different fluid can be arranged within the tube. An approximate vacuum can also prevail within the tube. Switching contact pieces of the circuit breaker that can move relative to one another can be arranged within the tube and a switching path can be formed between said switching contact pieces. The electrically insulating fluid, which is accommodated in the interior of the circuit breaker encapsulation section, can ensure electrical insulation of the circuit breaker outside the tube of the circuit breaker. For this purpose, the circuit breaker can be supported in an electrically insulated manner on the circuit breaker encapsulation section or another encapsulation section. The electrically insulating fluids used, which are accommodated by the circuit breaker encapsulation section or another encapsulation section, may be, for example, fluorine-containing gases or liquid such as, for example, sulfur hexafluoride, fluoronitrile, fluoroketone, fluoroolefin or else other suitable electrically insulating fluids such as, for example, $CO_2$, nitrogen, oxygen and mixtures with these substances. Nitrogen can be mixed, in particular, with an oxygen component.

The use of a first and a second disconnector allows the circuit breaker to be connected, for example, electrically in series to said disconnectors. For this purpose, the first disconnector and the second disconnector can be arranged respectively upstream and downstream of the circuit breaker on differing connection sides of the circuit breaker. As a result, it is possible to open the circuit breaker on either side by means of the disconnectors. Furthermore, it is also possible to use disconnectors to perform alternate or simultaneous connection of the same connection side of the circuit breaker for example to a first and a second cable (or other connection lines) by means of the first disconnector and the second disconnector on one and the same connection side of the circuit breaker. As a result, it is possible to make a selection by means of the first and the second disconnector. For example, a circuit breaker can be incorporated into a ring line in this way, wherein the circuit breaker can be fed from one or from the other ring half by way of alternate connection of the first and the second disconnector or a ring can be looped through when they are switched on simultaneously.

The first and the second disconnector are arranged in a first disconnector encapsulation section and in a second disconnector encapsulation section. The disconnector encapsulation sections are preferably hermetically separated from one another here, so that fluids which are separated from one another, in particular electrically insulating fluids, can be arranged in the interior of each of the encapsulation sections. Therefore, electrically insulating fluids which are separated from one another can be accommodated by means of the different encapsulation sections.

In order to allow a phase conductor to pass from one encapsulation section to the other encapsulation section, one region should preferably be of electrically insulating configuration, so that the fluids are separated and electrically insulated passage of the phase conductor between the individual encapsulation sections is rendered possible. For example, supporting insulators can be used for this purpose, these being required to keep the phase conductors or the phase conductor at a distance from an electrically conductive region of a wall of an encapsulation section. For example, it is therefore possible for the encapsulation section to be of electrically conductive design in one region and only the regions in which the phase conductor passes through a wall (barrier) of an encapsulation section to be of electrically insulating configuration. What are known as electrically insulating bushings can be used for the passage of the phase conductor through a wall of an encapsulation section. Said bushings are, for example, disk-like insulators which close an opening, for example in a main body of the encapsulation section, in an electrically insulating manner.

A bushing can be of fluid-tight design, if necessary a bushing or the phase conductor which is guided through can have a channel via which an electrically insulating fluid can pass from one encapsulation section to another encapsulation section. The encapsulation sections can preferably be hermetically disconnected from one another and only electrically insulated passage of the corresponding phase conductors between encapsulation sections can be permitted.

A circuit breaker encapsulation section can be of substantially tubular design for example, wherein the tube axis is oriented approximately in a vertical. As a result, an upright circuit breaker encapsulation section is formed, the disconnector encapsulation sections being arranged on the lateral surface of said circuit breaker encapsulation section. Accordingly, positioning of the disconnector encapsulation sections and the disconnectors in the interior of said disconnector encapsulation sections is rendered possible if required starting from the circuit breaker positioned in the interior of the circuit breaker encapsulation section in radial directions. For connecting encapsulation sections, said encapsulation sections can have, for example, flanges by means of which the encapsulation sections are connected to one another. Flanges are also suitable for guiding a phase conductor through from one encapsulation section to another encapsulation section and for receiving a bushing.

The position of the encapsulation sections in relation to one another can be defined by selecting the positions of flanges. In respect of the design of the disconnector encapsulation sections and the filling thereof, the same procedure as that for the circuit breaker encapsulation section can be followed.

A disconnector encapsulation section can be indirectly or directly attached to a circuit breaker encapsulation section. In the case of indirect attachment, an increased distance between the disconnector encapsulation section and the circuit breaker encapsulation section can be created, for example, by using an intermediate encapsulation section. For example, a further circuit breaker encapsulation section and/or a further disconnector encapsulation section etc. can serve as the intermediate encapsulation section. Flanges used for attachment should be oriented horizontally on one axis in alignment. A second, preferably structurally identical circuit breaker encapsulation section can also serve as the intermediate encapsulation section. The intermediate encapsulation section can also serve to deflect a phase conductor and in this way prevent direct, linear passage of said phase conductor (for example in the direction of an aligned axis of the flanges).

A further advantageous refinement may make provision for the disconnector encapsulation sections to be oriented in alignment with one another.

The disconnector encapsulation sections can preferably be oriented in alignment with one another. Here, the enveloping contour of the corresponding disconnector encapsulation sections is approximately identical in the direction of an alignment axis. As a result, for example, slim switching arrangements with a small footprint requirement can be used. Furthermore, it is possible in a simplified manner in this way to guide, for example, cables for incorporating the switching arrangement into an electrical power transmission system to the switching arrangement and to connect said cables to said switching arrangement. Here, the disconnector encapsulation sections can likewise be of substantially tubular design, analogously to the substantially tubular circuit breaker encapsulation section. Here, the cross section of a substantially tubular circuit breaker encapsulation section should preferably be selected to be larger than the cross section of a disconnector encapsulation section. The disconnector encapsulation sections can preferably also be of identical design. The disconnector encapsulation sections can also grant, for example, angled access to the interior of the circuit breaker encapsulation section. In the case of a substantially tubular disconnector encapsulation section, a flange for connection to a circuit breaker section can be situated, for example, on the lateral surface, so that the tube axes of the circuit breaker encapsulation housing and a disconnector encapsulation section arranged on the lateral surface are substantially parallel. Therefore, it is possible, for example, to guide a phase conductor out of the interior of the circuit breaker encapsulation section at the lateral surface via a disconnector encapsulation section fitted on the lateral surface and to divert said phase conductor, for example in an angled manner, within the disconnector encapsulation section. Therefore, it is possible, for example, to deflect the phase conductor section through approximately 90° in the interior of a disconnector encapsulation section. Aligned orientation of the disconnector encapsulation sections in relation to one another can be achieved by selecting the angular position.

An advantageous refinement may make provision for the disconnector encapsulation sections to be oriented in alignment with one another in the direction of a vertical axis of the first circuit breaker encapsulation section.

A vertical axis of the circuit breaker encapsulation section can be determined, for example, by a tube axis of the circuit breaker encapsulation section. The vertical axis can preferably be oriented in a vertical. The disconnector encapsulation sections can be attached on the lateral surface at a distance from one another along the vertical axis, so that the disconnector encapsulation sections are situated spaced apart on an axis which is oriented substantially parallel to the vertical axis of the circuit breaker encapsulation section. Particularly when angled disconnector encapsulation sections are used, said disconnector encapsulation sections can be oriented in alignment, wherein however opposite orientation of an angled branching of the disconnector encapsulation sections can be provided. Therefore, it is possible to feed, for example, supply lines, such as cables, to the circuit breaker via the disconnector encapsulation sections over the circumference of the circuit breaker encapsulation section and in so doing increase the footprint of the switching arrangement only slightly, preferably in one and the same position on the circumference. Disconnector encapsulation sections that are arranged in alignment along a vertical axis are preferably directly connected to the same circuit breaker encapsulation section. Flanges provided for bonding to the circuit breaker encapsulation section are oriented in the same radial direction on the lateral surface, but at a distance from one another in the direction of a vertical axis.

A further advantageous refinement may make provision for the disconnector encapsulation sections to be oriented in alignment with one another transversely to a vertical axis of the first circuit breaker encapsulation section.

A transverse axis can substantially perpendicularly pass, for example, the vertical axis of the circuit breaker encapsulation section, in particular intersect the vertical axis, wherein the disconnector encapsulation sections can be positioned on opposite sides of the lateral surface of the circuit breaker encapsulation section. Therefore, perpendicular orientation of the different axes in relation to one another is provided, wherein the disconnector encapsulation sections are in alignment with one another in the direction of the transverse axis. This is advantageous particularly when the disconnector encapsulation sections are intended to provide an angled branch on the lateral surface of the circuit breaker encapsulation section and said branches are intended to be oriented with the same sense of direction. Therefore, it is possible, for example, to feed a first cable to the circuit breaker encapsulation section via the first disconnector encapsulation section and to feed a second cable to the circuit breaker encapsulation section via the second disconnector encapsulation section, wherein the two cables head toward the circuit breaker encapsulation section from one and the same direction. When flanges are used for connecting different encapsulation sections to one another, use of an encapsulation section which creates an indirect bond between the circuit breaker encapsulation section and the disconnector encapsulation section may be provided. A further circuit breaker encapsulation section can be used for spacing them apart. Therefore, it is possible, for example, to orient two or three circuit breaker encapsulation sections, preferably of identical construction, parallel to one another and to flange-connect said circuit breaker encapsulation sections to one another. Coupling flanges, which connect the circuit breaker encapsulation sections to one another at a fixed angle, can be used on the lateral surface for this purpose. If required, a phase conductor can pass through coupling flanges. Flanges for flange-connecting disconnector encapsulation sections and coupling flanges are preferably situated diametrically opposite on the lateral surface of a circuit breaker encapsulation section. Therefore, a linear fixed-angle bond between a plurality of circuit breaker encapsulation sections and a plurality of disconnector encapsulation sections is possible, wherein flanges used for connection are advantageously situated on one axis in alignment with one another.

Advantageously, provision may further be made for the disconnector encapsulation sections to each have a cable connection, wherein the cable connections on the disconnector encapsulation sections are oriented respectively opposite one another.

It is possible to connect a cable to the circuit breaker encapsulation section via a cable connection to a disconnector encapsulation section. By way of using an angled design of a disconnector encapsulation section, at least one phase conductor, which is provided through the cable, can be inserted at the lateral surface into the interior of the circuit breaker encapsulation section in this way. By way of orientation of the angular position, the cables can head toward the circuit breaker encapsulation section from different directions or head toward the circuit breaker encapsulation section from the same direction. For example, cable plug connectors, which can be plug-mounted onto an external cone of the cable connection for example, can serve as a cable connection. However, the cable connection can conversely also have a substantially conical socket, wherein a corresponding mating piece on the cable allows electrical contact-connection. Irrespective of its specific configuration, it is possible for a cable connection to feed a cable in a dielectrically impeded and stable manner to the switching arrangement and to conduct the phase conductor of the cable through a wall of a disconnector encapsulation section in an electrically insulated and electrically stable manner.

Opposite orientation of the cable connections makes it possible to allow, for example, cables to run on toward the circuit breaker encapsulation section from opposite directions and to allow the corresponding cables to open out at the first disconnector encapsulation section or at the second disconnector encapsulation section. In this case, the opposite orientation relates to the insertion direction of the phase conductor of the respective cable on the respective disconnector encapsulation section. Opposite orientation of the cable connections with aligned orientation of the disconnector encapsulation sections can preferably be provided in the direction of the vertical axis of the circuit breaker encapsulation section. Therefore, it is possible, for example, to conduct a phase conductor to/from the circuit breaker with a constant footprint of the switching arrangement.

A further advantageous refinement may make provision for the disconnector encapsulation sections to each have a cable connection, wherein the cable connections on the disconnector encapsulation sections are each oriented with the same sense.

Orienting the cable connections of the different disconnector encapsulation sections with the same sense allows different cables to access the respective disconnector encapsulation sections from one and the same direction. Particularly with orientation of the disconnector encapsulation sections in alignment with a transverse axis, it is possible to arrange a plurality of disconnector encapsulation sections in a manner distributed over the circumference of the circuit breaker encapsulation section and to respectively guide cables to the switching arrangement from one and the same direction. Reference is made to the information provided above in respect of the design of the cable connections.

A further advantageous refinement may make provision for a grounding switch to be arranged at least on one of the disconnector encapsulation sections.

A grounding switch serves to apply ground potential to a phase conductor. This is desirable in particular for safety circuits. Therefore, for example, even with a faulty connection, a ground connection can be induced, as a result of which safety switch-off generally takes place automatically. In this respect, a grounding switch is a safety system by means of which ground potential can be disconnected from the phase conductor, for example of a disconnector or subsequently a circuit breaker, if required. Particularly rapid connection of ground potential can be performed if required, depending on the functioning of the grounding switch. What are known as rapid-action grounding switches can be used for this purpose. Provision may also be made for a make-proof grounding switch to be used, which even with a live phase conductor can forcibly connect said phase conductor to ground. Here, the grounding switch can protrude into the interior of the respective disconnector encapsulation section and connect the phase conductor located there to ground. The ground potential can be provided, for example, by electrically conductive regions of the disconnector encapsulation section which carry ground potential, for example.

A further advantageous refinement may make provision for at least one of the disconnectors to be designed as a three-position device.

In a three-position device, one and the same drive arrangement can drive a disconnector contact piece or a plurality of disconnector contact pieces which carry the same potential and operate firstly a disconnector and secondly a grounding switch, so that the disconnector and the grounding switch are forcibly locked. A changeover from the disconnecting function to the grounding function can be made via a neutral position of a movable disconnector contact piece, wherein the disconnector and the grounding switch are open in the neutral position and alternate switch-on of the disconnector or the grounding switch via one and the same drive arrangement is ensured.

The disconnector contact piece of a three-position device can preferably be designed as a linearly movable disconnector contact piece, wherein the firstly the switching point for the disconnector and secondly the switching point for the grounding switch can be provided at opposite ends of the disconnector contact piece.

A further advantageous refinement may make provision for a drive arrangement of the circuit breaker to be arranged flanked by two disconnector encapsulation sections.

In order to achieve a compact design, a drive arrangement of the circuit breaker can be flanked by disconnector encapsulation sections. For example, a drive arrangement for the circuit breakers can be positioned on the end sides of the upright circuit breaker encapsulation sections. A circuit breaker encapsulation section can at least partially span the drive arrangement. Switching contact pieces of the circuit breaker which can move relative to one another can be driven by means of the drive arrangement. Flanking by disconnector encapsulation sections allows efficient utilization of installation space on the switching arrangement. Therefore, installation space available in the direction of a vertical axis of the circuit breaker is used for positioning the drive device of the circuit breaker. Furthermore, the drive device can be mechanically protected by the flanking disconnector encapsulation sections. The flanking disconnector encapsulation sections should preferably be situated transversely to a vertical axis of the circuit breaker encapsulation section and preferably be congruently in alignment. Therefore, starting from the drive arrangement, a switching movement can be transmitted into the interior of the circuit breaker encapsulation section by means of a kinematic chain. Here, the kinematic chain can pass through a barrier of the circuit breaker encapsulation section in a fluid-tight manner and transmit a movement through the barrier, for example a wall, in a fluid-tight manner.

A further advantageous refinement may make provision for the first circuit breaker encapsulation section to be arranged flanked by a disconnector encapsulation section and a secondary housing.

What are known as secondary devices, which are arranged on the switching arrangement within a secondary housing, are required for driving the switching arrangement or for operating the switching arrangement. Secondary devices are, for example, control arrangements, measuring devices, protective devices etc. which serve to operate the switching arrangement. The secondary housing and the disconnector encapsulation section, which flank the circuit breaker encapsulation section, should be arranged on opposite sides of a transverse axis, which is oriented substantially perpendicularly to a vertical axis of the circuit breaker encapsulation section, if required. Here, provision may advantageously be made for the secondary housing to be spanned by a further disconnector encapsulation section or for its part to span a further disconnector encapsulation section. Therefore, the footprint taken up by the switching arrangement is used in an expedient manner.

The secondary housing can be fastened to the circuit breaker encapsulation section, so that the circuit breaker encapsulation section supports the secondary housing. The secondary housing can be fastened to a disconnector encapsulation section and therefore, for example, also supported indirectly by the circuit breaker encapsulation section.

A further advantageous refinement may make provision for the first and a second circuit breaker encapsulation section to be arranged between a first disconnector encapsulation section and a second disconnector encapsulation section.

The use of two circuit breaker encapsulation sections renders it possible to increase the number of circuit variants that can be implemented using the switching arrangement. Here, the first and the second circuit breaker encapsulation section should be of substantially identical construction and be oriented axially in parallel. For example, the tube axes can be of parallel design to one another given a substantially tubular configuration of the two circuit breaker encapsulation sections. The tube axes can preferably be arranged in a vertical, so that both the first and the second circuit breaker encapsulation section are arranged upright. Accordingly, the circuit breakers arranged in the interior of the circuit breaker encapsulation sections are likewise preferably oriented upright. Both the first and the second circuit breaker encapsulation section can be switched on by means of the first or the second disconnector encapsulation section. For this purpose, the corresponding phase conductor is distributed over node points, between the disconnectors or the circuit breakers. The first disconnector encapsulation section and the second disconnector encapsulation section can be connected to the lateral surface of one and the same circuit breaker encapsulation section. However, provision may also be made for each of the disconnector encapsulation sections to be connected to a respective one of the circuit breaker encapsulation sections. In this case, a respective circuit breaker encapsulation section acts as an intermediate encapsulation section for the other circuit breaker encapsulation section. The circuit breaker encapsulation sections are preferably connected to one another at a fixed angle by means of coupling flanges. The coupling flanges are advantageously situated in alignment with flanges on which a disconnector encapsulation section is arranged. Therefore, for example, an indirect bond between a circuit breaker encapsulation section and a disconnector encapsulation section is possible.

A further advantageous refinement may make provision for the first circuit breaker and the first disconnector and the second circuit breaker and the second disconnector to be connected electrically in series and for a node point, from which a first and a second strand which comprise the respective circuit breaker and disconnector extend, to be arranged between the first circuit breaker and the second circuit breaker.

The first circuit breaker and the first disconnector are preferably connected to one another in series. Similarly, the second circuit breaker and the second disconnector are preferably electrically connected to one another in series. Therefore, the first circuit breaker and the first disconnector form a first strand, and the second circuit breaker and the second disconnector form a second strand. Here, the two strands can be electrically connected to one another at a node, wherein the two strands extend starting from the node. Given a respective series connection of a circuit breaker and a disconnector to one another, the node should preferably be formed on that side of the strand on which direct access to a connection side of the circuit breakers is granted. Therefore, direct contact-connection of the respective connection sides of the circuit breakers at the same node is rendered possible. Furthermore, use of a third strand comprising a third circuit breaker and a third disconnector can also be provided. Here, the circuit breakers are electrically conductively coupled to a connection side at a common node, wherein the strands with the respective disconnectors extend from the node.

A further advantageous refinement may make provision for the first circuit breaker and the first disconnector and the second circuit breaker and the second disconnector to be respectively connected electrically in series and form a first and a second strand, wherein a node point is arranged between the first circuit breaker and the first disconnector in the first strand so as to form a tap for a second strand comprising the second circuit breaker and the second disconnector.

A node point can be arranged between a first disconnector and a first circuit breaker, so that the first strand is segmented by the node point. The second strand can extend starting from the node point, wherein the second circuit breaker can preferably be arranged directed toward the node point. Therefore, it is possible to form the second strand as a tap which starts from the node point between the first disconnector and the first circuit breaker.

A further advantageous refinement may make provision for the switching arrangement to be of single-pole and encapsulated design.

Single-pole encapsulation of a switching arrangement at least in sections allows phase conductors with different potentials firstly to be positioned electrically insulated from one another and secondly to be held mechanically separated from one another by the encapsulation sections. Therefore, it is possible, for example, to configure a three-phase switching arrangement with in each case three encapsulation sections of single-pole design. Here, the encapsulation sections of the individual poles can preferably be of identical design and arranged in parallel. This results in an arrangement of compact construction which allows multiple use of encapsulation sections at different poles.

A further advantageous refinement may make provision for the respective encapsulation sections to be flange-connected to one another, in particular in a fluid-tight manner.

The different encapsulation sections can each receive, in their interiors, phase conductors of extremely different configurations. In order to allow a phase conductor to pass from one encapsulation section to another encapsulation section and therefore to allow transfer of an electric current through walls of the encapsulation sections, the encapsulation sections can have flanges. The flanges are preferably designed as annular flanges which allow the phase conductor to pass. Electrically insulating bushings, for example what are known as bushing insulators, which close the flange opening in a fluid-tight manner and ensure electrically insulating support for the phase conductor, can preferably be arranged in the flange region. Here, the flanges of the encapsulation sections should preferably be designed as screw-type flanges, wherein corresponding electrically insulating supporting insulators can preferably be placed in a flange gap in order to allow fluid-tight closure of a flange opening.

In what follows, an exemplary embodiment of the invention is shown diagrammatically in a drawing and described in greater detail in the following text.

BRIEF DESCRIPTION OF THE FIGURES

FIG. 13 shows a section through the pole of the seventh variant embodiment.

DETAILED DESCRIPTION OF THE INVENTION

Figure 1:
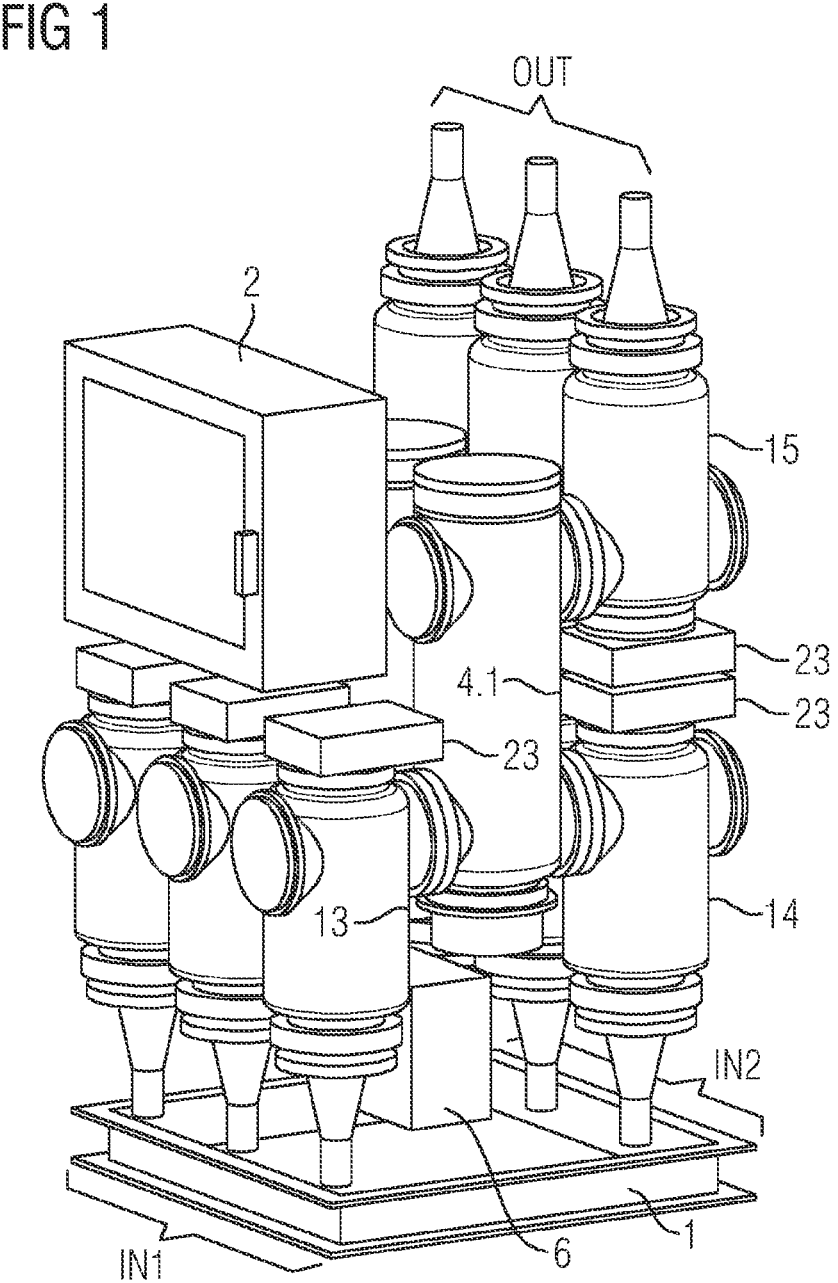
FIG. 1 shows a perspective view of a first variant embodiment of a switching arrangement.

The switching arrangement in a first variant embodiment shown in FIG. 1 is of three-pole design. Here, a single-pole encapsulation is provided, that is to say each phase conductor (pole) of a polyphase electrical power transmission system is arranged inside encapsulation sections, wherein each phase conductor is separated from one another from the other phase conductors of the system by means of separate encapsulation sections. This accordingly produces, for the switching arrangement, a structure inside which a plurality of identical poles are arranged parallel to one another, wherein said poles are supported on a common carrier frame 1. Furthermore, a common secondary housing 2 is provided which is fitted to one or more encapsulation sections of the switching arrangement and is also indirectly supported by the carrier frame 1 by means of said encapsulation sections. FIG. 1 shows, by way of example, a perspective view of the structure of the different variants, as shown in FIGS. 2, 3, 4, 5, 6, 7, 8, 9, 10, 11, 12 and 13. The individual variant embodiments each differ in respect of structure or use of the individual poles. The different variant embodiments share the common feature that poles of identical construction are arranged in succession in each case, so that, analogously to FIG. 1, corresponding perspective views of the different variant embodiments result. Irrespective of the variant embodiment in question, all the variants share the common feature that there is a first input IN1, a second input IN2 and an output OUT. In all the variants, a connection for cables is provided at the first input IN1, at the second input IN2 and at the output OUT.

Figure 2:
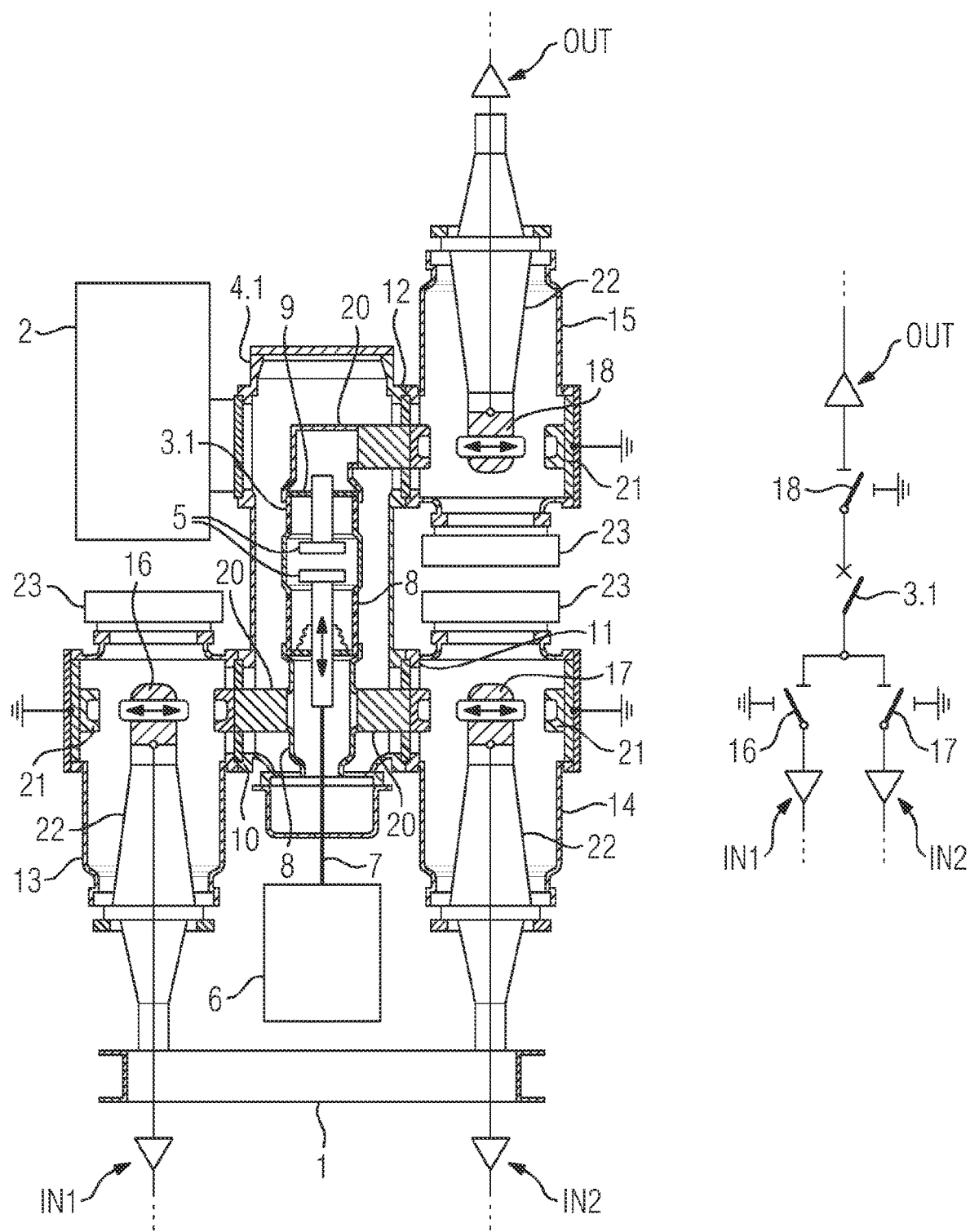
FIG. 2 shows a section through a pole of the switching arrangement in the first variant embodiment.

The first variant embodiment of a switching arrangement according to FIG. 1 has a single-pole insulation. Similarly, the further variant embodiments are also designed with single-pole insulation. By way of example, FIG. 2 illustrates a section through one of the switching poles, as known from FIG. 1. The switching arrangement in a first variant embodiment has a first circuit breaker 3.1. The first circuit breaker 3.1 is surrounded by a first circuit breaker encapsulation section 4.1. The first circuit breaker encapsulation section 4.1 has a substantially tubular configuration, wherein a tube axis serves as a vertical axis, so that the first circuit breaker encapsulation section 4.1 is oriented in an upright position. In accordance with the upright position of the first circuit breaker encapsulation section 4.1, the first circuit breaker 3.1 is arranged substantially centrally in the interior of the first circuit breaker encapsulation section 4.1. In the present case, the first circuit breaker 3.1 is equipped with a vacuum interrupter which has a tube body which closes off a vacuum in the interior. Switching contact pieces 5 which can move relative to one another are arranged inside the tube body. In order to achieve a relative movement between the switching contact pieces 5, a drive device 6 is connected by means of a kinematic chain 7 to at least one of the switching contact pieces 5 which can move relative to one another. In the present case, the kinematic chain 7 has an axially displaceable switching rod which can move substantially along the vertical axis of the first circuit breaker encapsulation section 4.1. Accordingly, the switching contact pieces 5 move linearly relative to one another. The kinematic chain 7 is arranged on a first connection side 8 of the first circuit breaker 3.1. A second connection side 9 of the first circuit breaker 3.1 is arranged at the opposite end of the first circuit breaker 3.1. The first circuit breaker 3.1 can be connected to further sections of a phase conductor by means of the two connection sides 8, 9. The first circuit breaker 3.1 constitutes a switchable section in a phase conductor.

A first connection flange 10, a second connection flange 11 and a third connection flange 12 are arranged on the lateral surface of the first circuit breaker encapsulation section 4.1. The first and the second connection flange 10, 11 are arranged diametrically opposite on the lateral surface, so that they lie on an axis which intersects the vertical axis of the first circuit breaker encapsulation section 4.1. The second connection flange 11 and the third connection flange 12 are likewise arranged axially at a distance, but the axial distance runs substantially parallel to the vertical axis of the first circuit breaker encapsulation section 4.1, so that the first connection flange 10 and the second connection flange 11 allow access to the first connection side 8 of the first circuit breaker 3.1, while the third connection flange 12 grants access to the second connection side 9 of the first circuit breaker 3.1.

A first disconnector encapsulation section 13, a second disconnector encapsulation section 14 and a third disconnector encapsulation section 15 are arranged on the connection flanges 10, 11, 12. The disconnector encapsulation sections 13, 14, 15 are each of structurally identical design and have a substantially tubular structure. Here, the tube axes are oriented substantially parallel to the vertical axis of the first circuit breaker encapsulation section 4.1.

In order to impress a movement onto a respective disconnector contact piece by disconnectors 16, 17, 18, a disconnector drive 23 is arranged at the end of the respective disconnector encapsulation section 13, 14, 15 which is arranged opposite a cable connection 22. In the present case, a separate disconnector drive 23 is respectively provided for each of the disconnector contact pieces on each of the disconnector encapsulation sections 13, 14, 15. A disconnector drive may possibly also be used for driving a plurality of disconnector contact pieces of a plurality of poles.

Here, positioning of the cable connections 22 is provided in such a way that the cable connections 22 on the first and the second disconnector encapsulation section 13, 14 are oriented with the same sense, whereas the cable connection 22 of the third disconnector encapsulation section 15 is oriented opposite to the cable connections 22 of the first disconnector encapsulation section 13 and the second disconnector encapsulation section 14.

On account of the position of the connection flanges 10, 11, 12 on the first circuit breaker encapsulation section 4.1, the second disconnector encapsulation section 14 and the third disconnector encapsulation section 15 are oriented in alignment with one another by way of their enveloping contour, wherein the alignment axis is arranged parallel to the vertical axis of the first circuit breaker encapsulation section 4.1. Furthermore, the first disconnector encapsulation section 13 and the second disconnector encapsulation section 14 are likewise oriented in alignment with one another, wherein the alignment axis is oriented substantially perpendicularly to the vertical axis of the first circuit breaker encapsulation section 4.1 and the alignment axis preferably passes through the vertical axis of the first circuit breaker encapsulation section 4.1.

Disconnectors 16, 17, 18 are respectively arranged in the disconnector encapsulation sections 13, 14, 15. The first, the second and the third disconnector 16, 17, 18 are what are known as three-position devices, wherein their movable disconnector contact piece is linearly displaceable.

Here, the displacement axis of the disconnector contact piece is selected in such a way that it is oriented substantially transversely to the respective vertical axis and the respective disconnector contact piece is associated with the end side of a connection flange 10, 11, 12. A fluid-tight electrically insulating barrier is arranged in the flange connection between the connection flanges 10, 11, 12 and the disconnector encapsulation sections 13, 14, 15, so that the interior of the first circuit breaker encapsulation section 4.1 is closed in a fluid-tight manner. A mating contact piece of the respective disconnector 16, 17, 18 is positioned above the fluid-tight electrically insulating barrier. A connecting conductor 20, by means of which a mating contact piece of the respective disconnector contact piece is electrically contact-connected to the first connection side 8 or the second connection side 9 of the first circuit breaker 3.1, passes through the fluid-tight barrier. Depending on requirements, the shaping of the respective connecting conductor 20 can vary. A grounding contact 21 is arranged on the respective disconnector encapsulation section 13, 14, 15 opposite the disconnector mating contact piece. Owing to linear displacement of the disconnector contact piece, said disconnector contact piece can firstly extend into the respective mating contact piece, this creating an insulation path with respect to the grounding contact 21. If required, the disconnector contact piece can also be mounted in a neutral position (as shown in the figures). For the purpose of connection to ground, the disconnector contact piece is linearly displaced in the direction of the grounding contact 21 and allows the cables respectively connected to the disconnector encapsulation sections 13, 14, 15 to be connected to ground. For this purpose, a phase conductor of the respective cable is electrically conductively connected to the respective disconnector 16, 17, 18. Cable connections 22 are provided in order to electrically contact-connect a cable to the respective disconnector 16, 17, 18 in a stable manner. The cable connections 22 each have a substantially coaxial socket which each span and close an end side of the respective disconnector encapsulation section 13, 14, 15. A mirror-inverted connection fitting of the respective cable can be inserted into this socket of the respective cable connection 22, so that a dielectrically and mechanically stable connection of the respective cable to the switching arrangement is provided.

With the circuit variant as shown in FIG. 2, it is possible to electrically connect the two cables located at the inputs IN1, IN2, by means of the first disconnector 16 and the second disconnector 17, to the first connection side 8 of the circuit breaker 3.1 alternately or in parallel. If required, a cable connected to the output OUT can be electrically conductively connected to the second connection side 9 of the circuit breaker 3.1 via the third disconnector 18. Conversely, the cables can be connected to ground via the respective disconnectors 16, 17, 18 by way of electrical contact-connection to the respective grounding contact 21.

Figure 3:
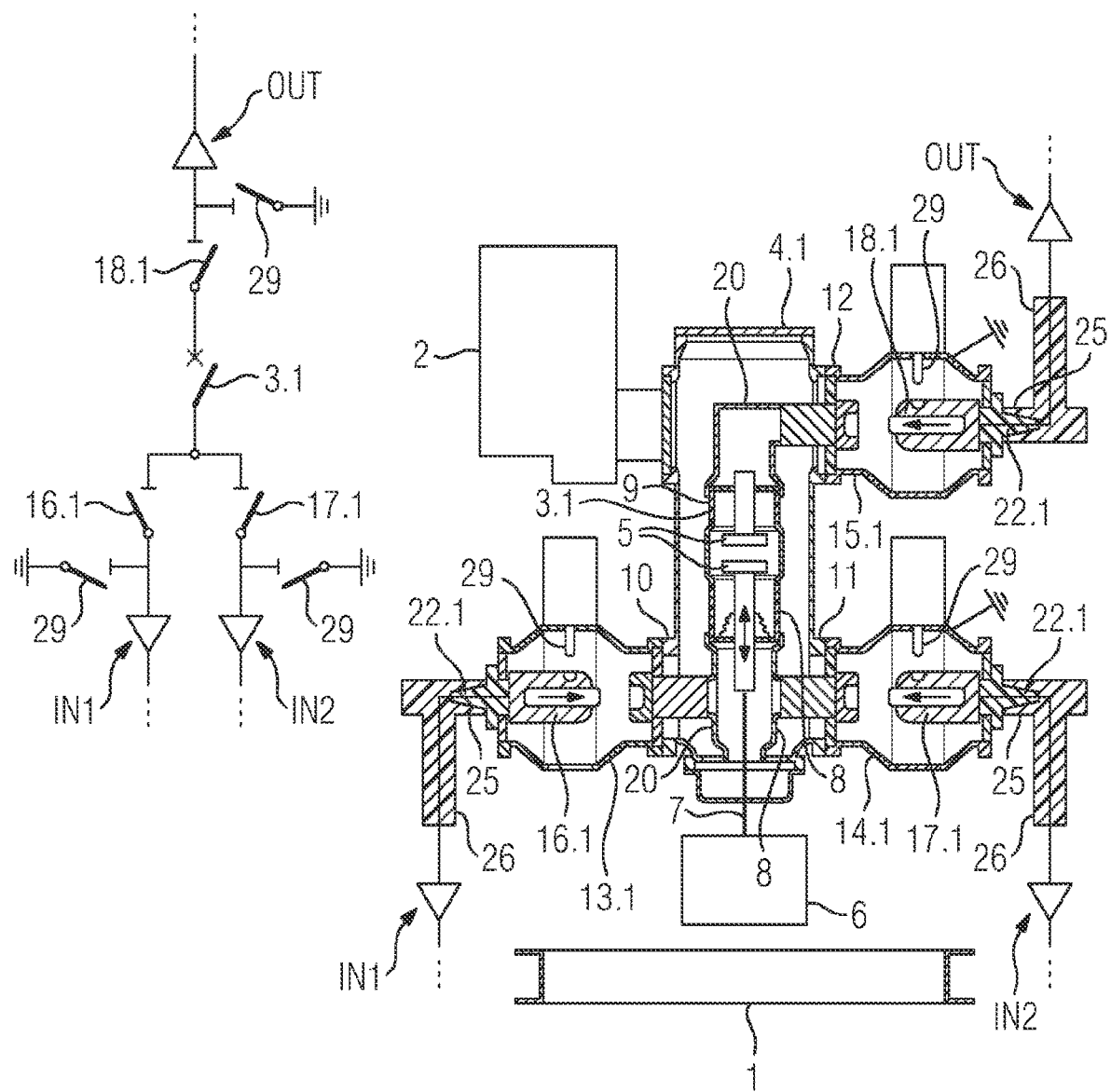
FIG. 3 shows a section through a pole of a switching arrangement in a second variant embodiment.

FIG. 3 shows a second variant embodiment of a switching arrangement. An alternative refinement of the disconnector encapsulation sections 13.1, 14.1, 15.1 is provided here. However, the electrical circuit, which can be implemented by the switching arrangement in the second variant embodiment according to FIG. 3, corresponds to the electrical circuit shown in FIG. 2 and described above.

However, the disconnectors 16.1, 17.1, 18.1 used are not three-position devices but merely disconnectors which allow connection or disconnection of cable connections 22 on the first connection side 8 or the second connection side 9 of the first circuit breaker 3.1. In order to be able to connect the cables connectable to the inputs IN1, IN2 and to the output OUT to ground, separate grounding switches 29 are provided which can move a ground-connected grounding contact piece, starting from a wall of the respective disconnector encapsulation section 13.1, 14.1, 15.1, in the direction of the disconnector contact piece. This allows, for example, rapid-action grounding switches 29 to be used. Furthermore, it is possible, with disconnectors 16.1, 17.1, 18.1 switched on, to also connect the first and, respectively, the second connection side 8, 9 of the circuit breaker 3.1 to ground.

In contrast to the cable connections 22 as are known from FIG. 2, cable connections 22.1 are provided here which provide an electrically insulating external cone 25 on the outside of the respective disconnector encapsulation section 13.1, 14.1, 15.1, by means of which a phase conductor is guided out of the interior of the respective disconnector encapsulation section 13.1, 14.1, 15.1 to the outside. There, contact-connection can be made with the phase conductors of the cables by means of what are known as cable plugs 26, which terminate the corresponding cables. For this purpose, the cable plugs 26 are plug-mounted onto the external cones 25 with a complementary shape. In the present case as shown in FIG. 3, what are known as angled plugs are used, as a result of which the phase conductor of a cable to be connected in each case can be deflected at each of the cable plugs 26. The cable connections 22.1 of the first disconnector encapsulation section 13.1 and the second disconnector encapsulation section 14.1 are oriented opposite to one another, whereas the cable connections 22.1 of the second disconnector encapsulation section 14.1 and the third disconnector encapsulation section 15.1 are oriented with the same sense. The disconnector encapsulation sections 13.1, 14.1 which are arranged on the first connection flange 10 and on the second connecting flange 11 of the first circuit breaker encapsulation section 4.1 are arranged in alignment in the direction of an alignment axis which is perpendicular to the vertical axis of the first circuit breaker encapsulation section 4.1. The second disconnector encapsulation section 14.1 and the third disconnector encapsulation section 15.1, by way of their respective enveloping contours, are oriented in alignment with an alignment axis which is oriented substantially parallel to the vertical axis of the first circuit breaker encapsulation section 4.1.

The third variant embodiment, the fourth variant embodiment, the fifth, the sixth and the seventh variant embodiment as shown in FIGS. 4 to 13 can implement variant circuits which require a first circuit breaker 3.1 and a second circuit breaker 3.2 and a third circuit breaker 3.3. The circuit breakers 3.1, 3.2, 3.3 are each of the same construction.

In the third variant embodiment, the first circuit breaker 3.1 is surrounded by a first circuit breaker encapsulation section 4.1. The second circuit breaker 3.2 is surrounded by a second circuit breaker encapsulation section 4.2. The two circuit breakers 3.1, 3.2 and the two circuit breaker encapsulation sections 4.1, 4.2 have substantially the same structure. Both the circuit breakers 3.1, 3.2 and the circuit breaker encapsulation sections 4.1, 4.2 correspond substantially to the first circuit breaker 3.1 and the first circuit breaker encapsulation section 4.1, as known from the first exemplary embodiment and the second exemplary embodiment. Accordingly, a kinematic chain 7 is associated with each circuit breaker 3.1, 3.2 and, by means of a respective drive device 6, causes a relative movement of switching contact pieces 5 which can move relative to one another. The circuit breakers 3.1, 3.2, analogously to the circuit breakers 3.1 of the first and the second variant embodiment, each have a connection side 8 and a second connection side 9, wherein the first connection side 8 is the side on which a movement is coupled in at the end side by means of the kinematic chain 7. A second connection side 9 is respectively arranged on the side of the circuit breakers 3.1, 3.2 facing the other way. The secondary housing 2 is supported by means of the first disconnector encapsulation section 13.

The first circuit breaker encapsulation section 4.1 has a second connection flange 11 and a third connection flange 15. A second disconnector encapsulation section 14 is arranged on the second connection flange 11. A third disconnector encapsulation section 15 is arranged on the third connection flange 12.

The second circuit breaker encapsulation section 4.2 of the second circuit breaker 3.2 has a first connection flange 10. A first disconnector encapsulation section 13 is arranged on the first connection flange 10. The disconnector encapsulation sections 13, 14, 15 of the third variant embodiment are of identical design to the disconnector encapsulation sections 13, 14, 15 of the first variant embodiment here and have an identical structure and identical function in respect of the disconnectors 16, 17, 18 received in each case. Accordingly, the third disconnector 18 is electrically conductively connected to the second connection side 9 of the first circuit breaker 3.1, whereas the second disconnector 17 is electrically conductively connected to the first connection side 8 of the first circuit breaker 3.1. Coupling flanges 28 are arranged on the first circuit breaker encapsulation section 4.1 and the second circuit breaker encapsulation section 4.2 diametrically opposite to the connection flanges 10, 11, 12 in each case. Here, the coupling flanges 28 serve to mechanically bond the circuit breaker encapsulation sections 4.1, 4.2, so that they are connected in a manner oriented upright and parallel to one another. Furthermore, if required, coupling flanges 28 can serve for passage of a phase conductor. Therefore, a phase conductor passes through the coupling flanges 28, which are situated on the first connection side 8 of the circuit breakers 3.1, 3.2, so that permanent electrical contact-connection (node) of the two circuit breakers 3.1, 3.2 is possible here. If required, the coupling flanges 28 can permit passage of a fluid from the one circuit breaker encapsulation section 4.1 to the other circuit breaker encapsulation section 4.2, and vice versa. However, provision may also be made for fluid-tight barriers to be arranged there, so that each of the circuit breaker encapsulation sections 4.1, 4.2 can receive a separate fluid. The first connection flange 10 on the second circuit breaker encapsulation section 4.2 is arranged on the lateral surface of the second connection side 9 of the second circuit breaker 3.2, so that electrical contact-connection between the first disconnector 16 and the second connection side 9 of the second circuit breaker 3.2 is possible. Owing to this arrangement, it is possible for the two circuit breakers 3.1, 3.2 to be connected electrically in series starting from the first disconnector 16 (input IN1) as far as the third disconnector 18 (output OUT). Furthermore, a branch to the input IN2, which can be disconnected by means of the second disconnector 17, is formed at the node between the two circuit breakers 3.1, 3.2.

Figure 4:
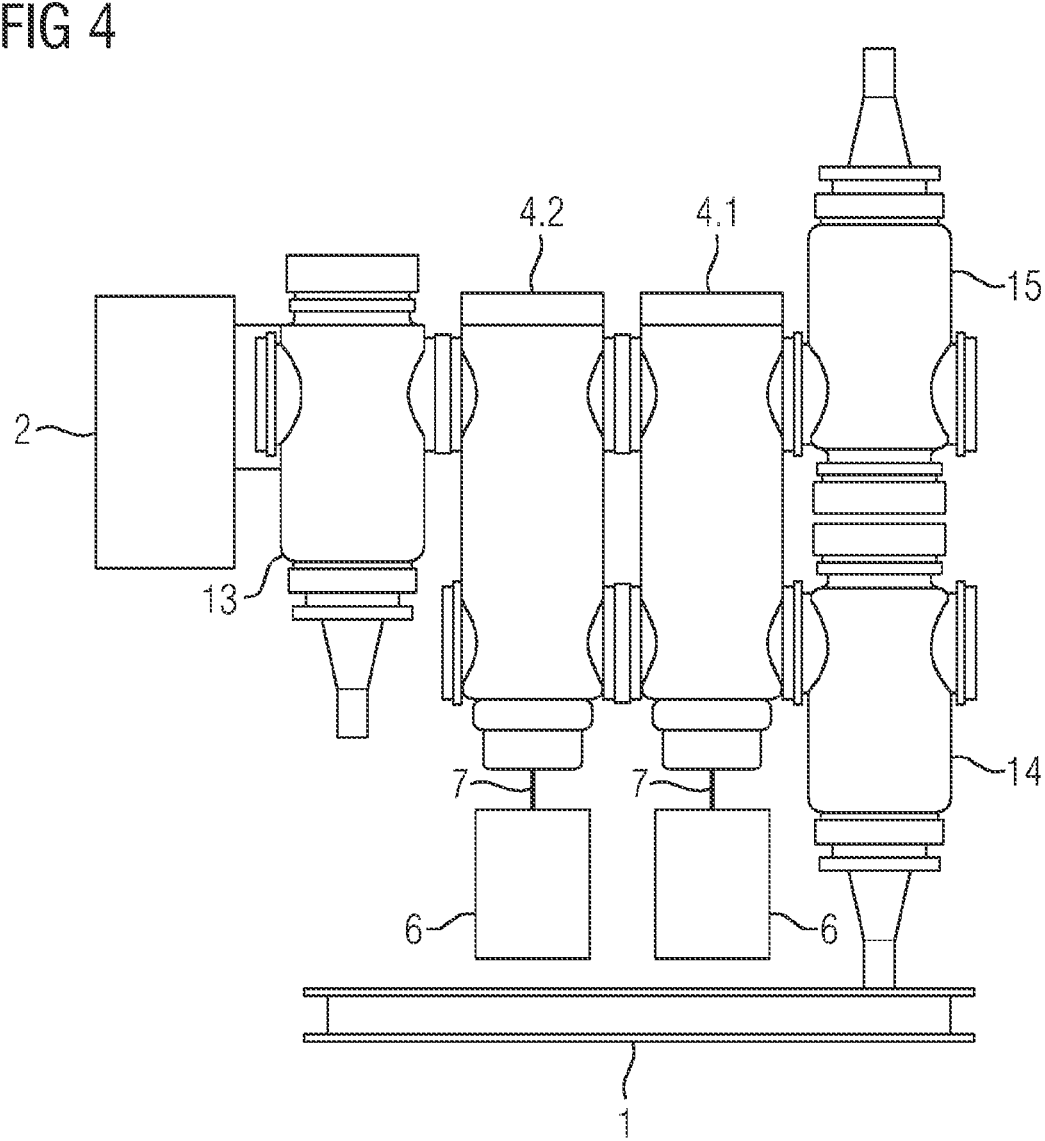
FIG. 4 shows a pole of a switching arrangement in a third variant embodiment.
Figure 5:
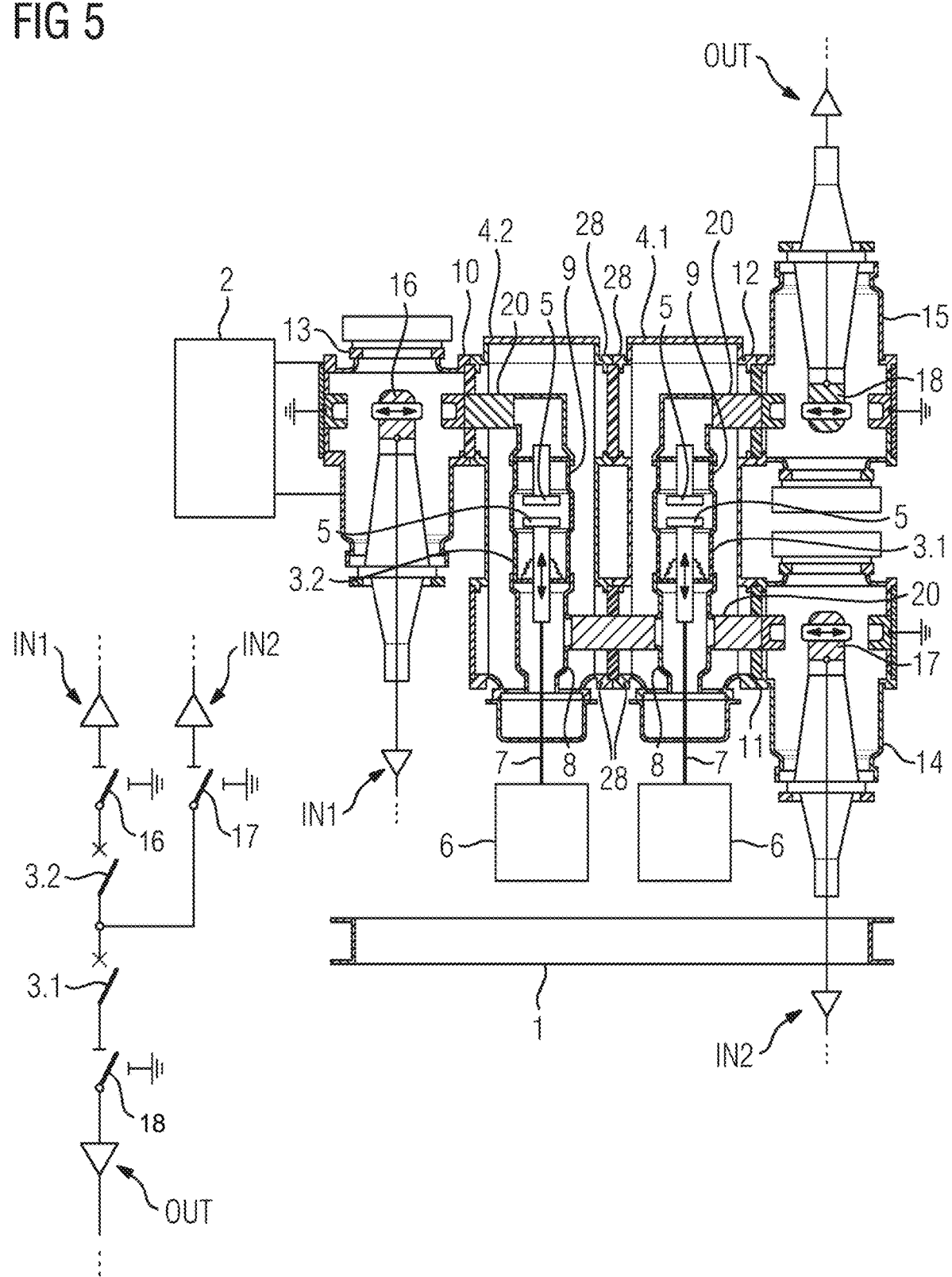
FIG. 5 shows a section through a pole of the switching arrangement in the third variant embodiment.
Figure 6:
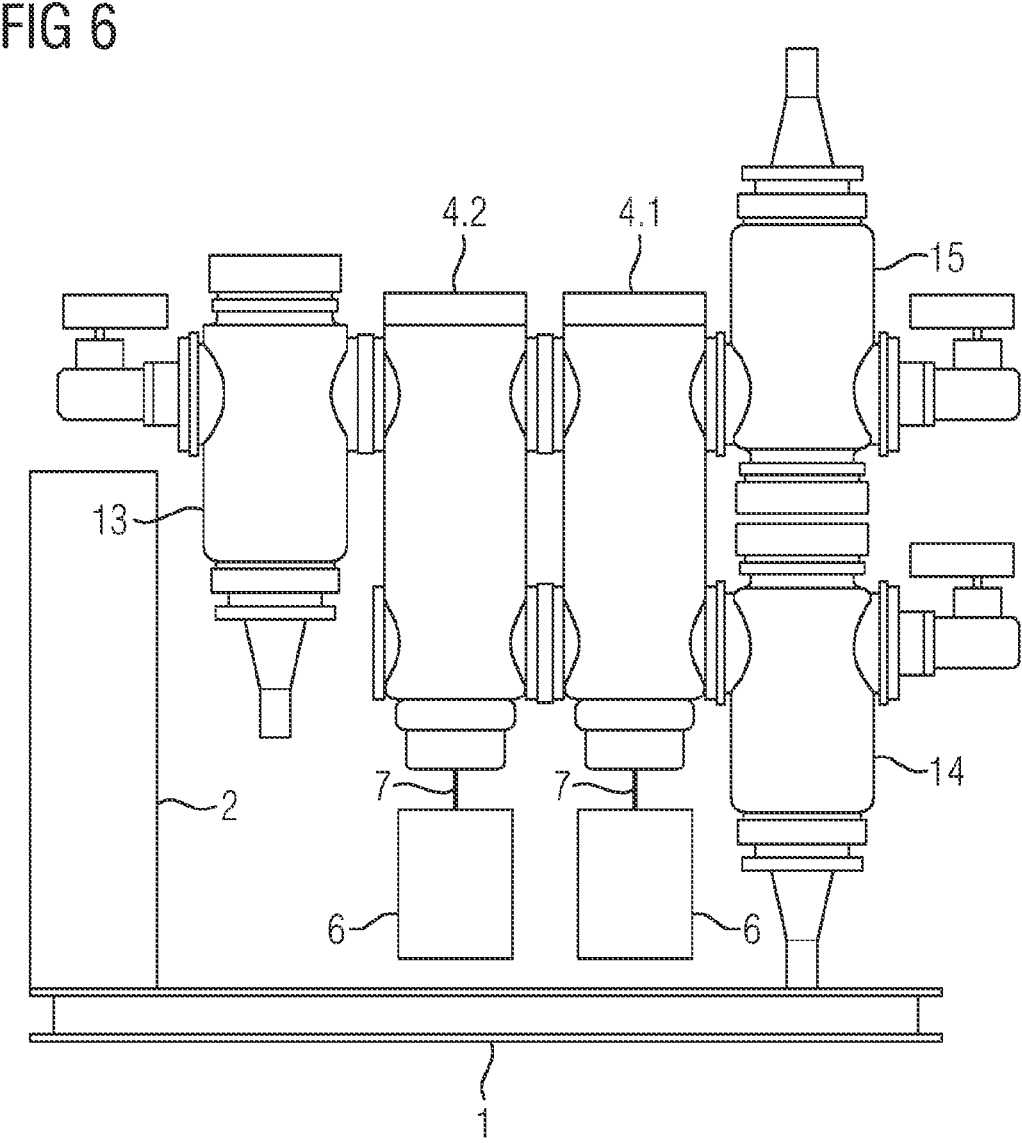
FIG. 6 shows a pole of a switching arrangement in a fourth variant embodiment.
Figure 7:
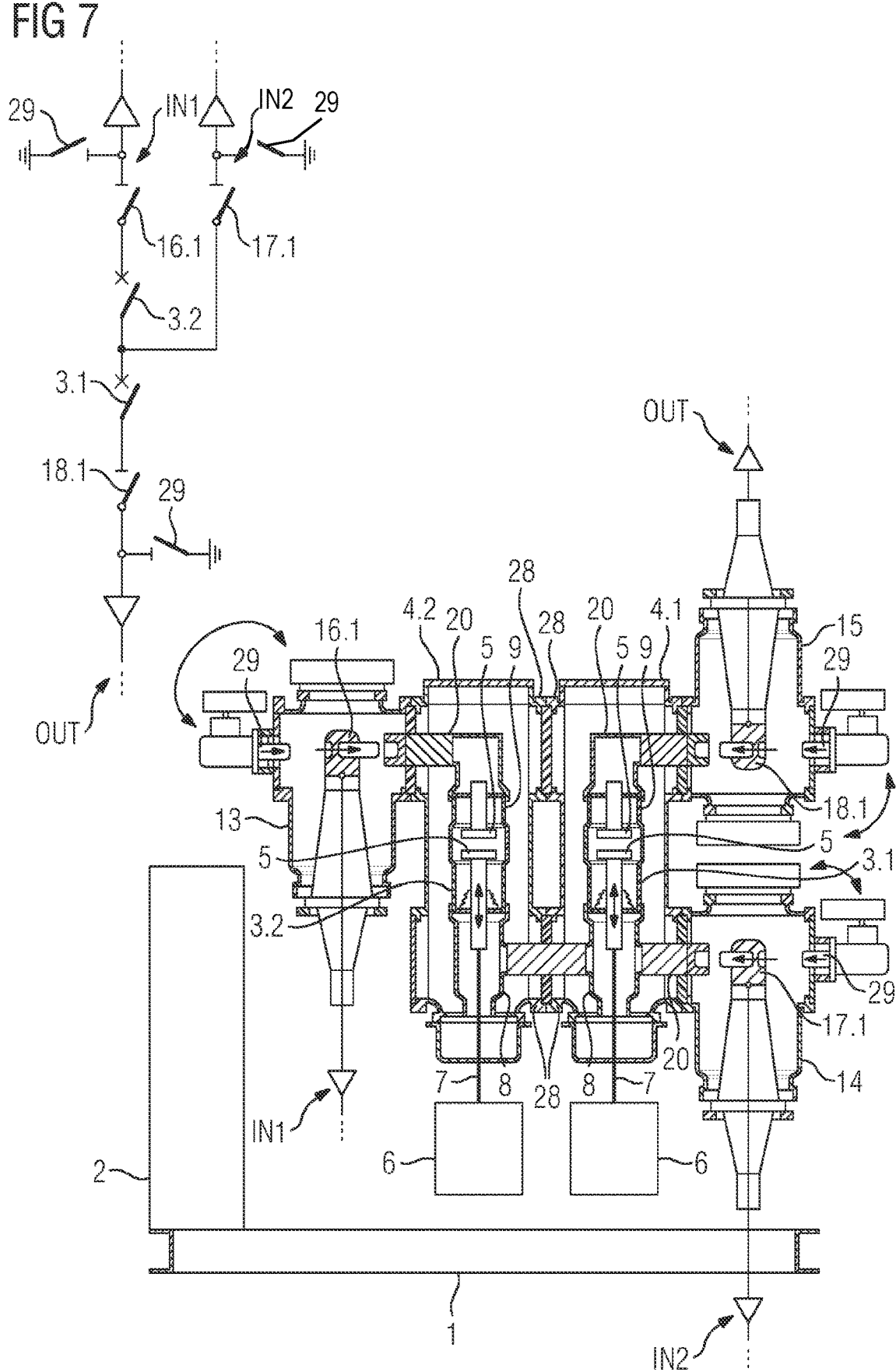
FIG. 7 shows a section through the pole of the fourth variant embodiment shown in FIG. 6.

FIGS. 6 and 7 show a fourth variant embodiment of a switching arrangement. The basic structure of the fourth design variant corresponds to the third design variant of a switching arrangement shown in FIGS. 4 and 5. Therefore, only the differences will be discussed below. In contrast to the third variant embodiment as shown in FIGS. 4 and 5, the secondary housing 2 is positioned on the carrier frame 1 and supported directly by said carrier frame. Furthermore, in contrast to the third variant embodiment according to FIGS. 4 and 5, the use of disconnectors 16.1, 17.1, 18.1 which use the same disconnector encapsulation sections 13, 14, 15 but each have a separate grounding switch drive for a separate grounding contact piece 29 instead of the design as a three-position device is provided. Therefore, the grounding contact pieces 29 can be moved with a movement profile different to that of the disconnector contact pieces. Therefore, for example, the use of rapid-action grounding means, which can also be connected into live phase conductors in a make-proof manner for example, is possible.

FIGS. 8 and 9 and FIGS. 10 and 11 show a fifth and a sixth variant of a switching arrangement. The refinement shown in FIGS. 8, 9 and 10, 11 has the same mechanical structure. The only difference is the position of the inputs IN1, IN2 and of the output OUT, as a result of which different variant circuits are established between the input IN1, IN2 and the output OUT.

Figure 8:
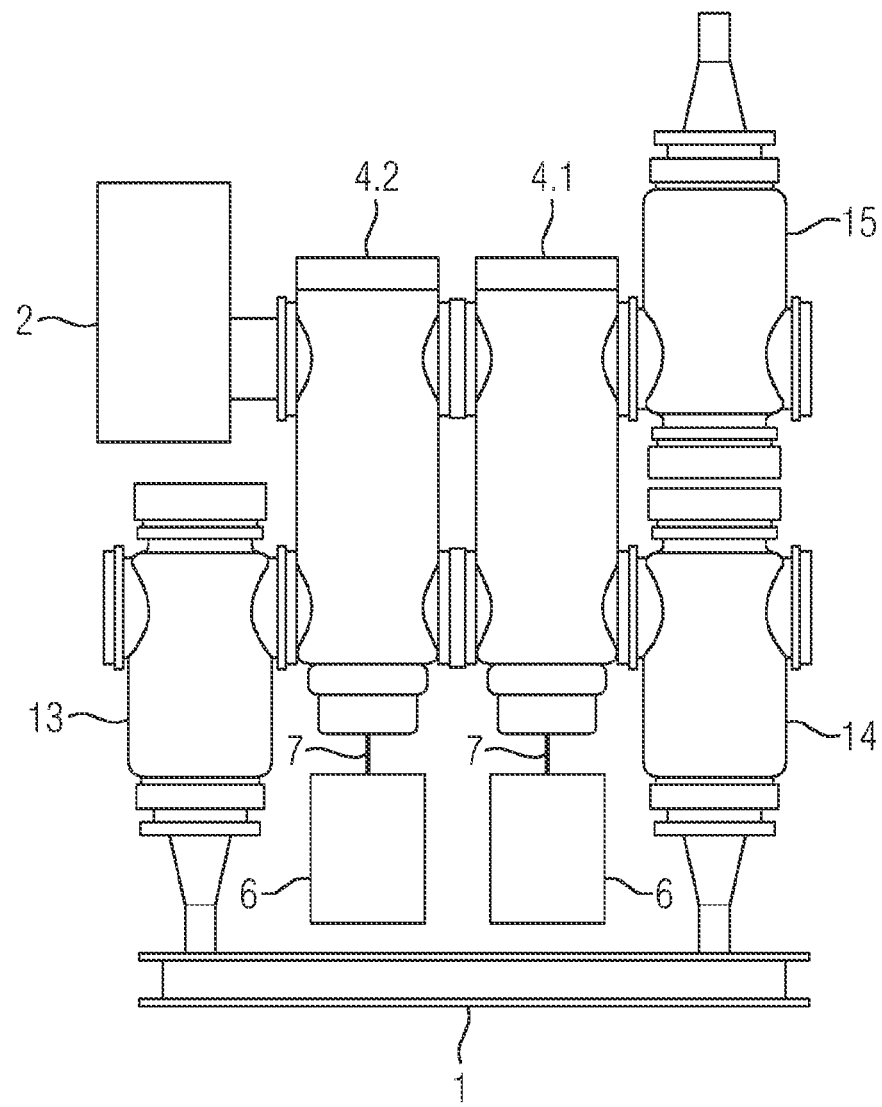
FIG. 8 shows a pole of a switching arrangement in a fifth variant embodiment.
Figure 9:
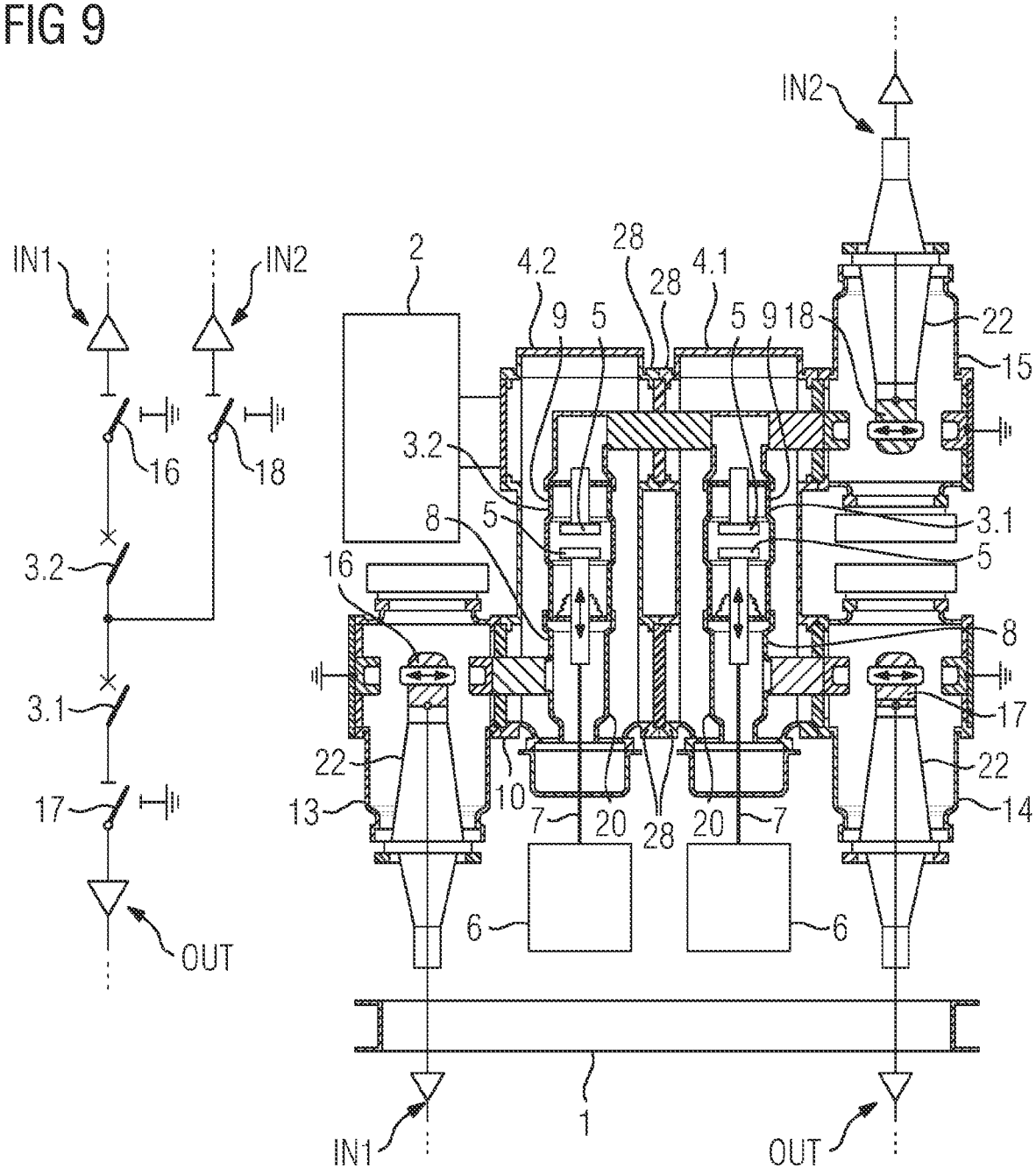
FIG. 9 shows a section through the pole in the fifth variant embodiment.

The mechanical structure and the electrical structure of the fifth variant embodiment of a switching arrangement will first be described with reference to FIGS. 8 and 9. Proceeding from the third variant embodiment of a switching arrangement shown in FIGS. 4 and 5, the position of the first disconnector encapsulation section 13 is changed. Instead of positioning on a first connection flange 10, which is arranged on a second connection side 9 of the second circuit breaker 3.2, the first connection flange 10 is now positioned on the lateral surface of the first connection side 8 of the second circuit breaker 3.2. Accordingly, a phase conductor on the first connection side 8, by way of the first connection flange 10 in a manner passing this, can be connected to the first disconnector 16 by means of the movable disconnector contact piece. Furthermore, the first disconnector 16 can be connected to a cable by means of a corresponding cable connection 22, which cable forms the input IN1. The circuit breaker encapsulation sections 4.1, 4.2 are connected to one another (node) by means of coupling flanges 28, wherein these are each arranged in alignment with an alignment axis, which the vertical axes of the circuit breaker encapsulation sections 4.1, 4.2 pass, with respect to the connection flanges 10, 11, 12 on the lateral surface. The second connection side 9 of the second circuit breaker 3.2 is electrically conductively (node) connected to the second connection side 9 of the first circuit breaker 3.1 with passage of coupling flanges 28. Furthermore, the second connection side 9 is connected to the third disconnector 18 by the first circuit breaker 3.1 and by the second circuit breaker 3.2. A cable, which functions as the input IN2, is connected to the third disconnector 18 by means of a cable connection 22.

Contact-connection with the second disconnector 17 is provided on the first connection side 8 of the first circuit breaker 3.1, and said second disconnector is in turn connected to a cable by means of a cable connection 22. This cable serves as an output OUT. Therefore, an arrangement is accordingly provided in which the cable connections 22 at the input IN2 and at the output OUT are directed opposite to one another, wherein the respective disconnector encapsulation sections 14, 15 are oriented in alignment with one another with respect to a vertical axis and have cable connections 22 which extend opposite to one another. Furthermore, the first disconnector encapsulation section 13 and the second disconnector encapsulation section 14 are likewise oriented in alignment, wherein the alignment axis crosses the vertical axes of the two circuit breaker encapsulation sections 4.1, 4.2. The cable connections 22 from the first disconnector encapsulation section 13 and from the second disconnector encapsulation section 14 are oriented with the same sense. Owing to circuitry of this kind, the fifth variant embodiment as shown in FIGS. 8 and 9 can perform the same switching task or switching function as the third variant embodiment which is shown in FIGS. 6 and 7, but wherein combined disconnectors and grounding switches are used. Two strands are formed which each have one disconnector 16, 17 and one circuit breaker 3.1, 3.2 in series. The two strands extend from one node, wherein the circuit breakers 3.1, 3.2 are permanently electrically conductively contact-connected to the node.

Figure 10:
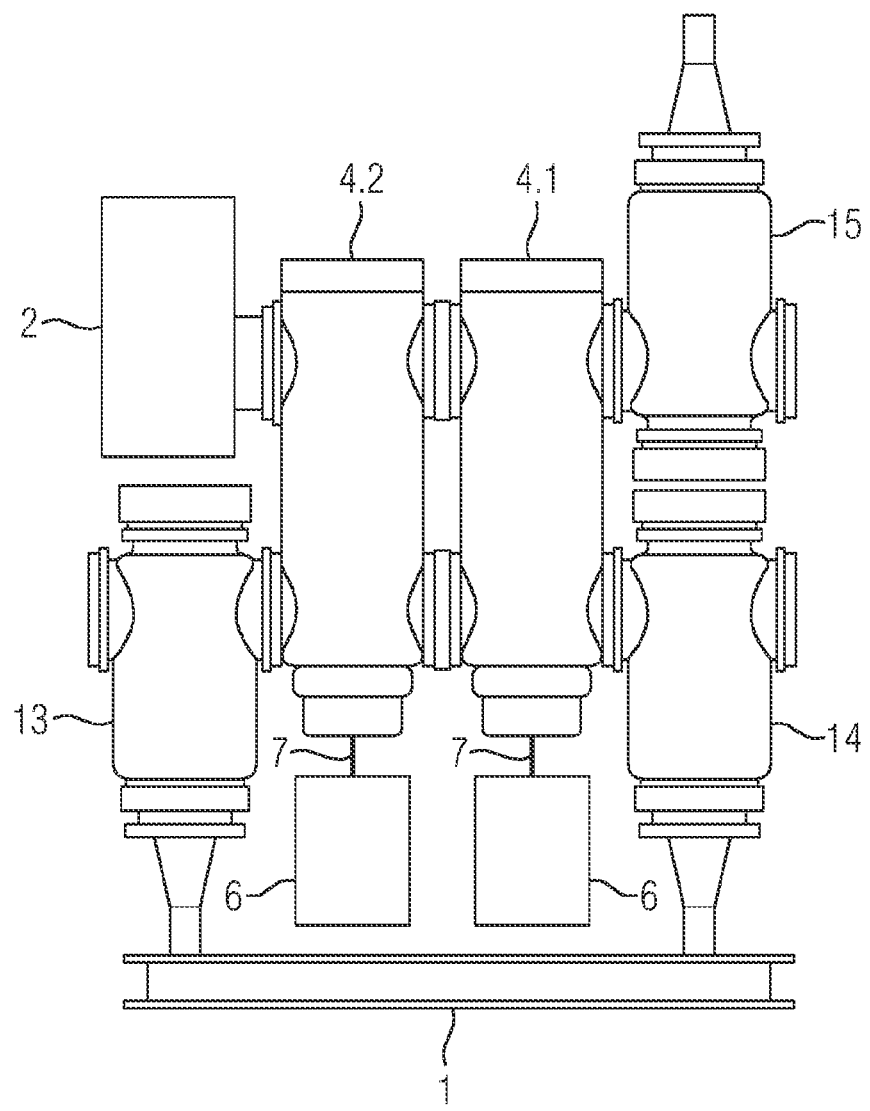
FIG. 10 shows a pole of a switching arrangement in a sixth variant embodiment.
Figure 11:
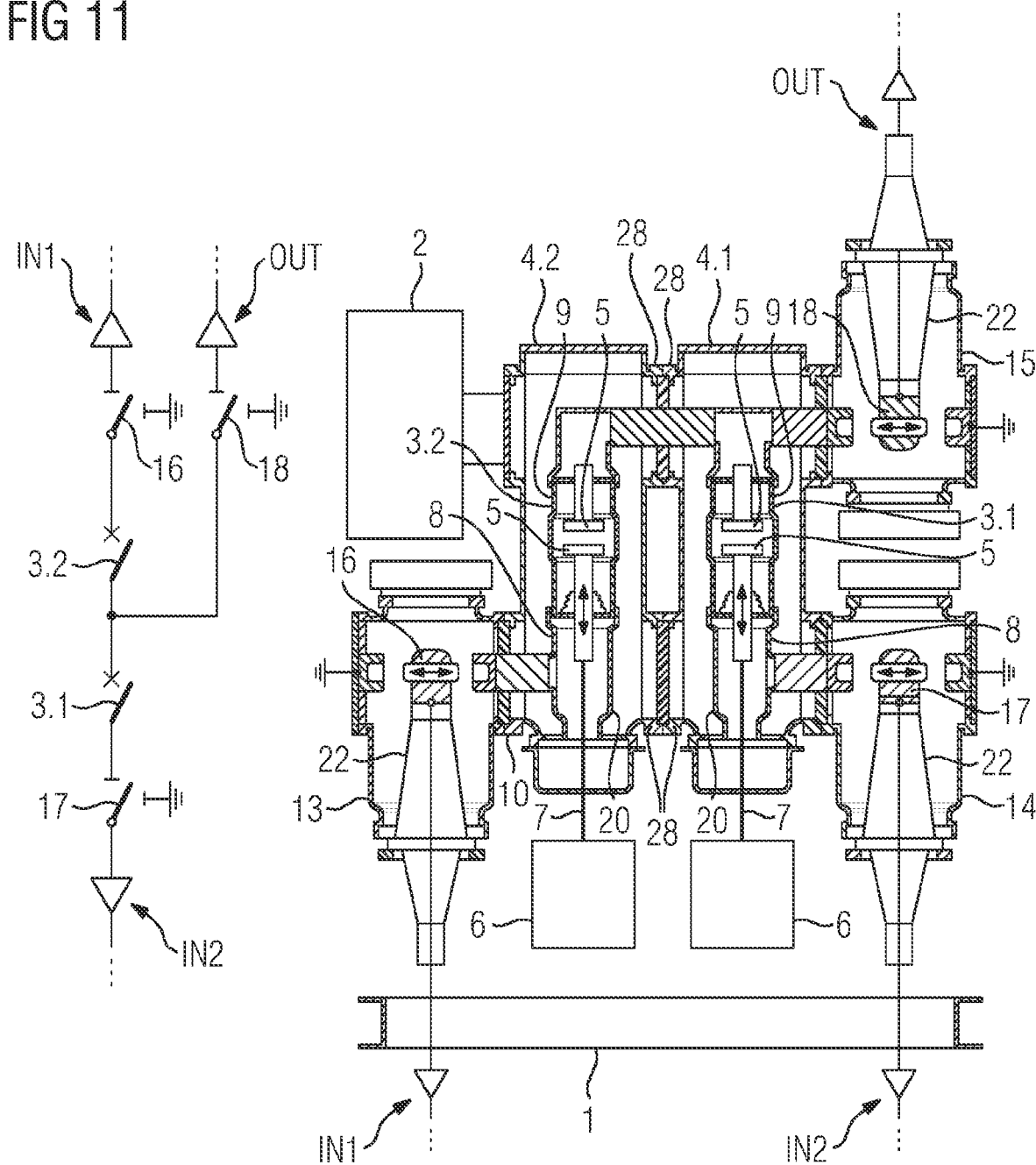
FIG. 11 shows a section through the pole of the sixth variant embodiment.

FIGS. 10 and 11 show a sixth variant embodiment of a switching arrangement. The mechanical structure of the switching arrangement shown in FIGS. 8 and 9 and 10 and 11 is selected to be identical here. Only the position of the second input IN2 and of the output OUT vary. In the present case, the second input IN2 is positioned on the second disconnector encapsulation section 14, whereas the output OUT is situated on the third disconnector encapsulation section 15. Owing to circuitry of this kind, a series circuit in each case comprising one disconnector 16, 17 and one circuit breaker 3.1, 3.2 is arranged both at the first and at the second input IN1, IN2, wherein the node (second connection side 9) connecting the two circuit breakers 3.1, 3.2 forms an output OUT which can be separated off by a third disconnector 18.

Therefore, different use of the same structure of the switching arrangement is possible by exchanging the positions of the second input IN2 for the output OUT (cf. FIGS. 8, 9 and FIGS. 10, 11).

Figure 12:
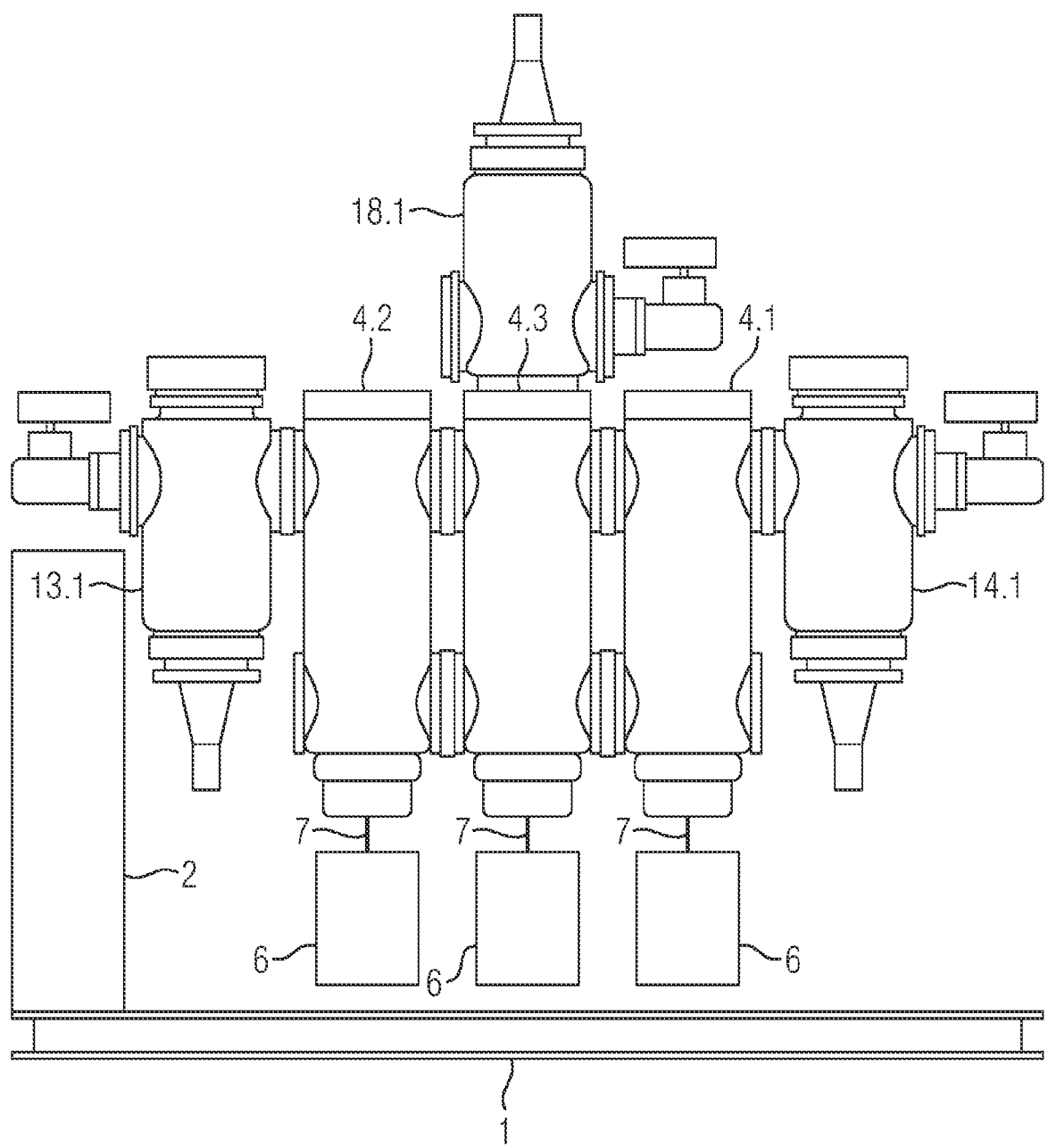
FIG. 12 shows a pole of a switching arrangement in a seventh variant embodiment.

The seventh variant embodiment of a switching arrangement shown in FIGS. 12 and 13 develops the fourth variant embodiment of a switching arrangement known from FIGS. 6 and 7. In the fourth variant embodiment, a first disconnector 16.1, which is connected electrically in series to the second circuit breaker 3.2, is arranged at the input IN1. A third disconnector 18.1 is connected electrically in series to the first circuit breaker 3.1 at the output OUT. A node, by which the two series circuits (strands) comprising in each case one circuit breaker 3.1, 3.2 and one disconnector 16.1, 17.1 are created, is formed between the two first connection sides 8 of the first and the second circuit breaker 3.1, 3.2. Only the input IN2 can be disconnected by means of an individual second disconnector 17.1 starting from the node on the first connection side 8 of the two circuit breakers 3.1, 3.2.

It is now also desirable to equip the second input IN2 with a series circuit comprising one circuit breaker and one disconnector, so that three strands extend starting from one node on the respectively first connection side of the circuit breakers 3.1, 3.2, 3.3, which strands each have one circuit breaker 3.1, 3.2, 3.3 and one disconnector 16.1, 17.1, 18.1 electrically in series, so that strands of identical construction extending from the node on the respectively first connection side 8 can be used.

Accordingly, the seventh variant embodiment is shown in FIGS. 12 and 13, which seventh variant embodiment has three strands starting from one node which have one circuit breaker 3.1, 3.2, 3.3 and one disconnector 16.1, 17.1, 18.1 for each of the inputs IN1, IN2 and for the output OUT. Analogously to the fourth variant embodiment, the use of separate grounding switches each with a driveable grounding contact piece 29 is also provided in order to individually connect the respective disconnectors 16.1, 17.1, 18.1 and therefore also the cables connected to the cable connections 22 to ground. Furthermore, with respectively switched-on disconnectors 16.1, 17.1, 18.1, the respective second connection sides 9 of the circuit breakers 3.1, 3.2, 3.3 can also be connected to ground. Ground potential can also be transmitted to the first connection side 8 (node) by means of switching on one of the circuit breakers 3.1, 3.2, 3.3.

Each of the three circuit breakers 3.1, 3.2, 3.3 has a circuit breaker encapsulation section 4.1, 4.2, 4.3. Both the circuit breakers 3.1, 3.2, 3.3 and the circuit breaker encapsulation sections 4.1, 4.2, 4.3 respectively have an identical structure. A first connection flange 10 is arranged on the lateral surface of the second circuit breaker encapsulation section 4.2 level with the second connection side 9. The first disconnector encapsulation section 13.1 is connected to the second circuit breaker encapsulation section 4.2 by means of the first connection flange 10. A second connection flange 11 is arranged on the lateral surface of the first circuit breaker encapsulation section 4.1 level with the second connection side 9 of the second circuit breaker 3.2. The second disconnector encapsulation section 14.1 is arranged on the second connection flange 11. A cable for forming an input IN1 can be connected to the associated cable connection 22 by means of the first disconnector 16.1. A cable for forming a second input IN2 can be connected to a cable connection 22 by means of the second disconnector 17.1. The two cable connections 22 are oriented with the same sense here. A third circuit breaker encapsulation section 4.3 is arranged between the first circuit breaker encapsulation section 4.1 and the second circuit breaker encapsulation section 4.2. The third circuit breaker encapsulation section 4.3 is arranged parallel to the vertical axis of the first circuit breaker encapsulation section 4.1 and the second circuit breaker encapsulation section 4.2 here, so that the circuit breaker encapsulation sections 4.1, 4.2, 4.3 are arranged substantially parallel and upright. Coupling flanges are provided diametrically opposite the first connection flange 10 and the second connection flange 11 for mechanically joining the circuit breaker encapsulation sections 4.1, 4.2, 4.3. Here, the coupling flanges 28 are arranged in alignment with the first and the second connection flange 10, 11, wherein corresponding mating flanges, which render possible connection to the coupling flanges 28, are located on the third circuit breaker encapsulation section 4.3 on account of the identical design. Further coupling flanges 28, which are flange-connected to corresponding mating flanges, are arranged on the first circuit breaker encapsulation section 4.1 and the second circuit breaker encapsulation section 4.2 on the lateral surface facing the central third circuit breaker encapsulation section 4.3. A phase conductor section passes through these coupling flanges 28, which are situated on the first connection side 8 of the circuit breakers 3.1, 3.2, 3.3, so that the first connection sides 8 of the circuit breakers 3.1, 3.2, 3.3 are electrically conductively connected to one another (node). Starting from the node, a strand is formed via the second circuit breaker 3.2 and the first disconnector 16.1 to the cable at the first input IN1. Analogously, a strand to the second input IN2 and, respectively, the cable located there is formed starting from the node via the first circuit breaker 3.1 and the second disconnector 17.1.

In order to form a third strand with the third circuit breaker 3.3 which is adjoined by a third disconnector 18.1, a third disconnector encapsulation section 15.1 is arranged on the end side of the third circuit breaker encapsulation section 4.3. For this purpose, a mating contact for the disconnector contact piece of the third disconnector 18.1 is positioned on the end side of the second connection side 9 of the third circuit breaker 3.3, wherein a cable connection 22 is arranged on the opposite end side of the third disconnector encapsulation section 15.1 in order to be able to connect a cable for the output OUT. In contrast to the structure of the first disconnector 16.1 and the second disconnector 17.1, the third disconnector 18.1 is designed in such a way that the connection sides of the third disconnector 18.1 are situated on opposite end sides of the third disconnector encapsulation section 15.1 and therefore the third disconnector 18.1 according to the seventh variant embodiment is not of angled design.

The functional assemblies shown in the individual figures can be exchanged for one another in respect of their structural configuration (for example circuit breaker, circuit breaker encapsulation section, disconnector encapsulation section, disconnector, disconnector contact piece, grounding switch, cable connection etc.), so that, for example, combinations are produced which allow both three-position devices for the disconnectors and also disconnectors with separate grounding switches etc. Furthermore, it is possible to exchange the cable connections for cable connections with internal cones and for cable connections with external cones etc.

The invention claimed is:

1. A switching arrangement, comprising:
an upright first circuit breaker encapsulation section having an outer surface;
a circuit breaker disposed in said upright first circuit breaker encapsulation section;
a first angularly-shaped disconnector encapsulation section;
a first disconnector disposed in said first angularly-shaped disconnector encapsulation section;
a first cable connection disposed on said first angularly-shaped disconnector encapsulation section;
a second angularly-shaped disconnector encapsulation section;
a second disconnector disposed in said second angularly-shaped disconnector encapsulation section; and
a second cable connection disposed on said second angularly-shaped disconnector encapsulation section;
said first and second angularly-shaped disconnector encapsulation sections each being disposed directly or indirectly on said outer surface of said upright first circuit breaker encapsulation section, and said first and second angularly-shaped disconnector encapsulation sections being mutually spaced apart at opposite ends of an imaginary line segment disposed parallel or perpendicular to a vertical axis of the upright first circuit breaker encapsulation section;

said first and second cable connections being oriented either opposite to one another or in an identical sense; and said orientations of said first and second angularly-shaped disconnector encapsulation sections having angular positions permitting cables connected to said first and second cable connections, respectively, to be directed parallel to the vertical axis of said upright first circuit breaker encapsulation section from either an identical direction or different directions.

2. The switching arrangement according to claim 1, wherein said first and second angularly-shaped disconnector encapsulation sections are oriented in alignment with one another.

3. The switching arrangement according to claim 1, wherein said first and second angularly-shaped disconnector encapsulation sections are oriented in alignment with one another in a direction of the vertical axis of said upright first circuit breaker encapsulation section.

4. The switching arrangement according to claim 1, further comprises a grounding switch disposed at least on one of said first and second angularly-shaped disconnector encapsulation sections.

5. The switching arrangement according to claim 1, wherein at least one of said first and second disconnectors is a three-position device.

6. The switching arrangement according to claim 1, wherein said circuit breaker includes a drive device flanked by said first and second angularly-shaped disconnector encapsulation sections.

7. The switching arrangement according to claim 1, further comprises a secondary housing, said upright first circuit breaker encapsulation section being flanked by one of said first and second angularly-shaped disconnector encapsulation sections and said secondary housing.

8. The switching arrangement according to claim 1, further comprises a second circuit breaker encapsulation section, said upright first and said second circuit breaker encapsulation sections being disposed between said first angularly-shaped disconnector encapsulation section and said second angularly-shaped disconnector encapsulation section.

9. The switching arrangement according to claim 8, wherein:
said circuit breaker is one of first and second circuit breakers each being disposed in a respective one of said upright first and said second circuit breaker encapsulation sections;
said first disconnector, said first circuit breaker, said second circuit breaker and said second disconnector are connected electrically in series; and
a node point is disposed between said first circuit breaker and said second circuit breaker, from which a first strand including said first circuit breaker and said first disconnector extends, and a second strand including said respective second circuit breaker and said second disconnector extends.

10. The switching arrangement according to claim 8, wherein:
said circuit breaker is one of first and second circuit breakers;
said first circuit breaker and said first disconnector and said second circuit breaker and said second disconnector are respectively connected electrically in series and form a first and a second strand; and
a node point is disposed between said first circuit breaker and said first disconnector to form a tap for said second strand including said second circuit breaker and said second disconnector.

11. The switching arrangement according to claim 1, wherein the switching arrangement has a single-pole and encapsulated configuration.

12. The switching arrangement according to claim 1, wherein said upright first circuit breaker encapsulation section and said first and second angularly-shaped disconnector encapsulation sections are flange-connected to one another.

13. The switching arrangement according to claim 12, wherein said flange-connections are fluid-tight.

* * * * *

UNITED STATES PATENT AND TRADEMARK OFFICE
CERTIFICATE OF CORRECTION

PATENT NO. : 12,046,879 B2
APPLICATION NO. : 17/614636
DATED : July 23, 2024
INVENTOR(S) : Stefan Beutel et al.

It is certified that error appears in the above-identified patent and that said Letters Patent is hereby corrected as shown below:

In the Claims

Column 20, Claim 9, Lines 14-19 should read as follows:
a node point is disposed between said first circuit breaker and said second circuit breaker, from which a first strand including said first circuit breaker and said first disconnector extends, and a second strand including said second circuit breaker and said second disconnector extends.

Signed and Sealed this
Third Day of September, 2024

Katherine Kelly Vidal
*Director of the United States Patent and Trademark Office*